(12) United States Patent
Grødum et al.

(10) Patent No.: US 10,775,761 B2
(45) Date of Patent: Sep. 15, 2020

(54) DYNAMIC PERSONALIZED ROOM CONTROL PANEL AND PERSONAL PREFERENCE ROOM SETUP

(71) Applicant: Cisco Technology, Inc., San Jose, CA (US)

(72) Inventors: Nicolai Grødum, Oslo (NO); Magnus Aaen Holst, Drammen (NO); Bjørn Kristian Nordlund, Nesoddtangen (NO)

(73) Assignee: CISCO TECHNOLOGY, INC., San Jose, CA (US)

(*) Notice: Subject to any disclaimer, the term of this patent is extended or adjusted under 35 U.S.C. 154(b) by 39 days.

(21) Appl. No.: 15/648,828

(22) Filed: Jul. 13, 2017

(65) Prior Publication Data

US 2019/0018381 A1 Jan. 17, 2019

(51) Int. Cl.
*G05B 19/048* (2006.01)
*G05B 19/042* (2006.01)

(52) U.S. Cl.
CPC ......... *G05B 19/048* (2013.01); *G05B 19/042* (2013.01); *G05B 2219/23258* (2013.01); *G05B 2219/24107* (2013.01); *G05B 2219/2642* (2013.01)

(58) Field of Classification Search
None
See application file for complete search history.

(56) References Cited

U.S. PATENT DOCUMENTS

| | | | |
|---|---|---|---|
| 7,228,141 B2 | 6/2007 | Sethi | |
| 8,116,889 B2* | 2/2012 | Krzyzanowski | .... H04L 12/2816 700/83 |
| 8,593,502 B2 | 11/2013 | Saleh et al. | |
| 8,842,153 B2* | 9/2014 | Ranganath | ............ H04M 3/565 348/14.01 |
| 8,909,779 B2 | 12/2014 | Clair et al. | |
| 8,988,485 B2 | 3/2015 | Verthein et al. | |
| 9,241,016 B2 | 1/2016 | Barth et al. | |
| 9,338,194 B2 | 5/2016 | Hendrickson et al. | |
| 9,451,414 B1 | 9/2016 | Birkenes et al. | |
| 9,473,580 B2 | 10/2016 | Barth et al. | |
| 2003/0103075 A1 | 6/2003 | Rosselot | |
| 2008/0045243 A1 | 2/2008 | Billmaier et al. | |
| 2014/0313282 A1* | 10/2014 | Ma | ......................... H04N 7/152 348/14.09 |
| 2015/0334245 A1 | 11/2015 | Lin et al. | |
| 2016/0080432 A1 | 3/2016 | Seferian et al. | |
| 2016/0373490 A1 | 12/2016 | Sedar et al. | |

OTHER PUBLICATIONS

"In-Room Control on Touch 10", User Interface Extensions, Cisco TelePresence, MX200G2, MX300G2, MX700, MX800, SX10, SX20, SX80, CE8.1, Apr. 2016, Cisco, D15358.01, 45 pages.

* cited by examiner

*Primary Examiner* — Carlos R Ortiz Rodriguez
(74) *Attorney, Agent, or Firm* — Edell, Shapiro & Finnan, LLC

(57) ABSTRACT

In one embodiment, a server configured to dynamically configure a personal control panel receives an indication of a detection of a user within a meeting room, where the meeting room includes a plurality of controllable components. The server then requests information about the plurality of controllable components within the meeting room. The server configures the personal meeting room control panel of the user based on the information about the plurality of controllable components within the meeting room.

20 Claims, 14 Drawing Sheets

DYNAMIC PERSONALIZED ROOM CONTROL PANEL AND PERSONAL PREFERENCE ROOM SETUP

TECHNICAL FIELD

The present disclosure relates to video conference endpoints and video conference meeting rooms.

BACKGROUND

Buildings often include multiple video conference meeting rooms, each room being equipped with an endpoint that captures audio and video of participants in the room during a conference session, for example, and then transmits the audio and video to a "far-end" endpoint. Each room may further include a unique set of controllable components (e.g., projector, projector screen, lights, window shades, displays, loudspeakers, microphones, cameras, thermostat, etc.) that may have an effect on a conference session being held within the room.

DESCRIPTION OF EXAMPLE EMBODIMENTS

Overview

In one embodiment, a server that is configured to dynamically configure a personal meeting room control panel, receives an indication of a detection of a user within a meeting room, where the meeting room includes a plurality of controllable components. The server then requests information about the plurality of controllable components within the meeting room. The server configures the personal meeting room control panel of the user based on the information about the plurality of controllable components within the meeting room.

Example Embodiments

In one embodiment, a method is provided to dynamically configure or reconfigure a personal meeting room control panel of a participant of a meeting to control components of a meeting room based on proximity detection of the participant at the meeting room. This provides a participant with ability to control the various components of the meeting room with their own personal and portable control panel. The personal meeting room control panel is dynamically and automatically reconfigured to control the components of a meeting room when the participant is detected within proximity of the meeting room. This eliminates participants having to learn each meeting room's control panel or having to locate and determine which switches (e.g., physical or virtual) control which components.

In another embodiment, a method is provided to dynamically preconfigure the components of a meeting room based on the participants detected within the meeting room and/or the context of the conference session/meeting to occur within the meeting room. Automatically preconfiguring a meeting room eliminates or minimizes the setup time of a meeting room to be completed by participants. Furthermore, similar to the dynamic personal meeting room control panel, the automatic preconfiguring eliminates participants having to learn each meeting room's control panel or having to locate and determine which switches (e.g., physical or virtual) control which components.

Figure 1:
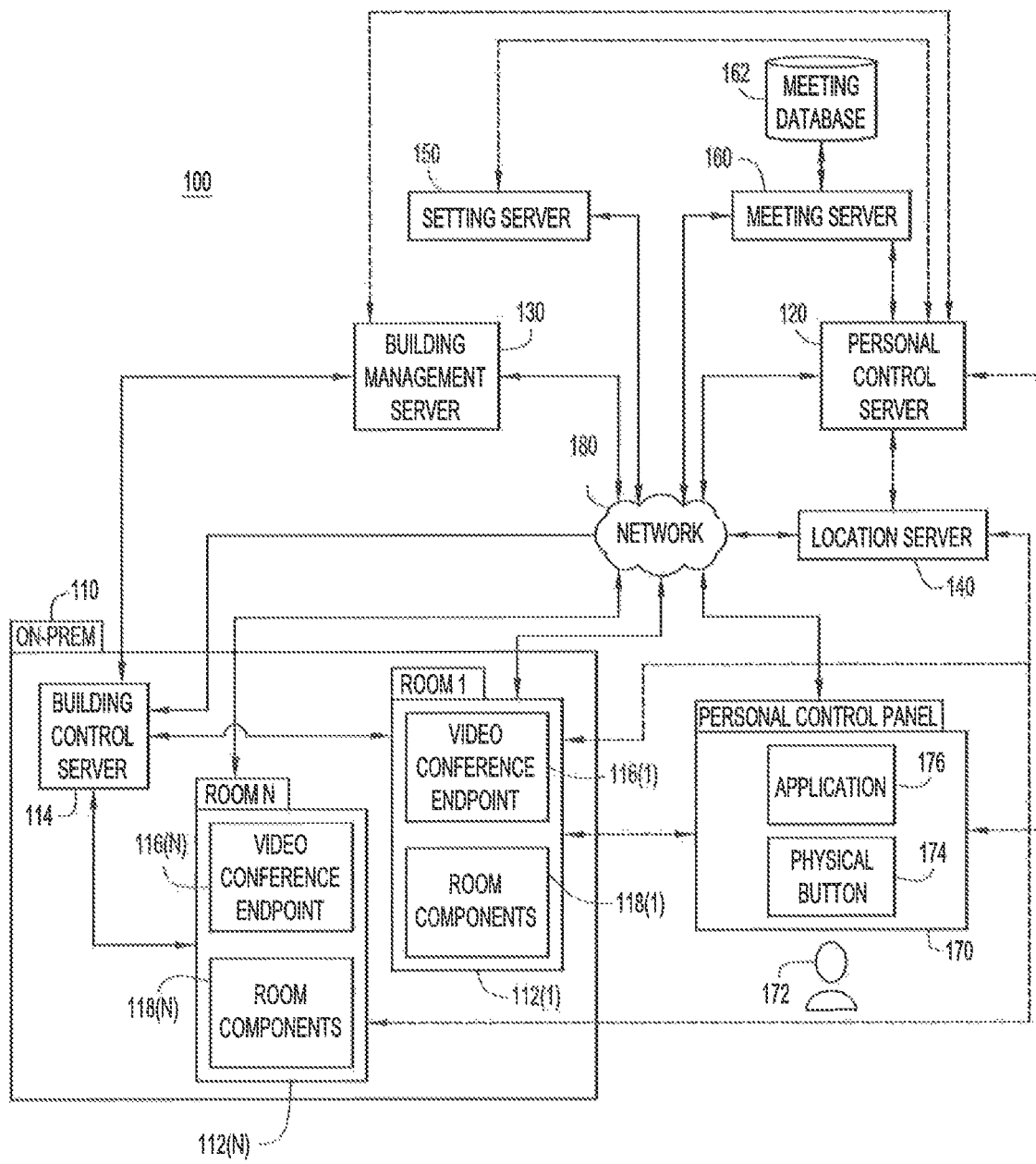
FIG. 1 is a block diagram of a system in which a control panel and the components of a video conference meeting room are dynamically configured based on a detected proximity of participants at video conference meeting rooms, according to an example embodiment.

With reference to FIG. 1, there is depicted a block diagram of a networking/computing system 100 in which a personal meeting room control panel of a participant can be configured to control the room components of a meeting room to enable the video conference endpoint of the meeting room to capture audio and video of participants located within the meeting room to send the captured audio and video to far-end endpoints, while also receiving and presenting the captured audio and video of the far-end endpoints.

The system 100 may include one or more buildings 110 (FIG. 1 only depicts a single building 110 for simplicity), where each building 110 that contains one or more meeting rooms 112(1)-112(N) and an on premise building control server 114. As further illustrated, each of the meeting rooms 112(1)-112(N) may be equipped with a video conference endpoint 116(1)-116(N) and a set of room components 118(1)-118(N). The system 100 further includes a personal control server 120, a building management server 130, a location server 140, a setting server 150, a meeting server 160, and a meeting database 162. As further illustrated, the system 100 also includes one or more personal meeting room control panels 170 of a participant/user 172 of the environment 100 (FIG. 1 only depicts a single control panel 170 for simplicity). As further detailed below, the personal control panel 170 may be embodied as a mobile electronic device (e.g., open source wireless microcontroller beacon/button, smartphone, tablet, laptop, etc.) equipped with physical buttons 174 or may be embodied as software application 176 operable on a mobile electronic device (e.g., smartphone, tablet, laptop, etc.). Each of the devices, servers, or systems of the system 100 is capable of communicating over the network 180. Network 180 may include one or more wide area networks (WANs), such as the Internet, and one or more local area networks (LANs).

Figure 2:
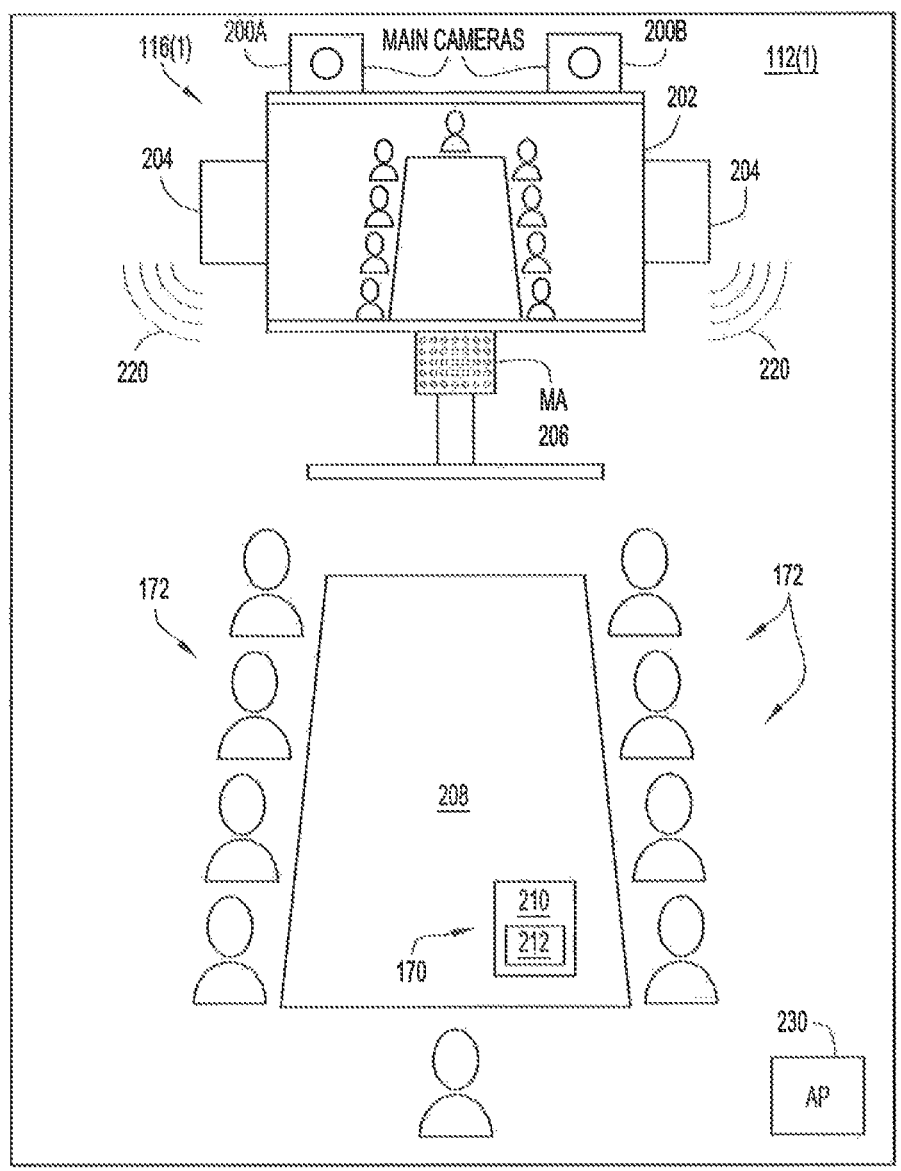
FIG. 2 is an illustration of video conference endpoint deployed in a conference meeting room and a mobile device in proximity of the video conference endpoint, according to an example embodiment.

Referring now to FIG. 2, and with continued reference to FIG. 1, there is an illustration of video conference endpoint 116(1) deployed in a conference room 112(1) (depicted simplistically as an outline in FIG. 2), according to an embodiment. Video conference endpoints 116(1)-116(N) may be operated by local users/participants 172 and configured to establish audiovisual teleconference collaboration sessions with other video conference endpoints over network 180. Each video conference endpoint 116(1)-116(N) may include one or more video cameras (VC) 200, a video display 202, a loudspeaker (LDSPKR) 204, and a microphone array (MA) 206. Endpoints 116(1)-116(N) may be wired or wireless communication devices equipped with the aforementioned components, such as, but not limited to laptop and tablet computers, smartphones, etc. In a transmit direction, endpoints 116(1)-116(N) capture audio/video from their local participants 172 with VC 200/MA 206, encode the captured audio/video into data packets, and transmit the data packets to other endpoints or a server. In a receive direction, endpoints 116(1)-116(N) decode audio video from data packets received from a server or other endpoints and present the audio/video to their local participants 172 via display 202/loudspeaker 204.

The video conference 116(1) illustrated in FIG. 2 includes main or center video cameras 200A and 200B positioned proximate and centered on display 202. Each of cameras 200A and 200B typically includes pan, tilt, and zoom (PTZ) features that may be implemented mechanically and/or digitally. Endpoint 116(1) controls the pan, tilt, and zoom features of each of the cameras 200A and 200B (collectively referred to as "cameras 200") to capture video of different views/scenes of participants 172 seated around a table 208 opposite from or facing (i.e., in front of) the cameras (and display 202). The combination of two video cameras depicted in FIG. 2 is only one example of many possible camera combinations that may be used, as would be appreciated by one of ordinary skill in the relevant arts having read the present description. As depicted in the example of FIG. 2, MA 206 is positioned adjacent to, and centered along, a bottom side of display 202 (i.e., below the display) so as to receive audio from participants 172 in room 112(1).

As illustrated in FIG. 2, located in proximity to the video conference endpoint 116(1) (e.g., within conference room 112(1)) is mobile electronic device 210. The mobile device 210 may include at least one microphone 212. Furthermore, the mobile device 210 may be configured to run the software application 176 of the personal control panel 170, or may be a physical representation of the personal control panel 170. In other embodiments, the mobile device 210 may include one or more cameras.

In the example of FIG. 2, mobile device 210 may be detected by the video conference endpoint 116(1) when in proximity to the video conference endpoint 116(1). In one embodiment, the video conference endpoint 116(1) may detect a mobile device 210 through a process referred to as "ultrasound detection." The ultrasound detection uses a space-limited inaudible, and unidirectional broadcast channel that conveys connection information to mobile devices 210 that are able to pica up the sound using, for example, the integrated microphone 212 of the mobile device 210. The connection information sent includes, but is not limited to, information that the mobile device 210 may use to wirelessly connect ("pair") to the video conference endpoint 116(1) or to establish communication with any of the servers 120, 130, 140, 150, 160 of the system 100.

More specifically, the video conference endpoint 116(1) generates and transmits ultrasound pairing signals 220 using, for example, ultrasound waves, via loudspeakers 204. In certain embodiments, the signals 220 may include the network address of any one of the servers 120, 130, 140, 150, 160 of the environment so that the mobile device 210 can connect to the servers 120, 130, 140, 150, 160 using any type of connection, such as a Wi-Fi® wireless network connection. In addition or alternatively, the signals 220 may include the network address of the video conference endpoint 116(1) so that the mobile device 210 can connect to the video conference endpoint 116(1) using another type of wireless connection.

In some embodiments, in addition to the network address, the ultrasound signals 220 may also contain a randomly generated code that changes periodically. The period at which the code changes may span from a few seconds to a few minutes, depending on security requirements. Once a mobile device 210 connects to the servers 120, 130, 140, 150, 160 and/or to the endpoint 116(1), the mobile device 210 may be configured to pass the code back to the video conference endpoint 116(1). Failure by the mobile device 210 to return a correct code to the video conference endpoint 116(1) may cause the connection between the mobile device 210 and the servers 120, 130, 140, 150, 160 and/or video conference endpoint 116(1) to be disabled. This ensures that mobile devices that know the address without being in the meeting room will not be able to reach the functionality of the endpoint 116(1), since they will not know the code that is only available to mobile devices 210 in proximity of the endpoint 116(1).

When a mobile device 210 receives the ultrasound pairing signals 220, the mobile device 210 decodes the signal to extract the network address. The mobile device 210 then uses the network address message to establish a connection with the servers 120, 130, 140, 150, 160 and/or with the video conference endpoint 116(1) to authenticate itself for purposes of completing the pairing process and becoming part of a video conference session. The connection of the mobile device 210 with the video conference endpoint 116(1) may be, for example, by way of a wireless network connection, a Bluetooth connection, etc. The connection of the mobile device 210 with any one of the servers 120, 130, 140, 150, 160 may involve use of a wireless network connection to the endpoint 116(1) or to a wireless router (e.g., AP 230) in the conference room 112(1), which is in turn has wide area network connectivity to the servers 120, 130, 140, 150, 160. Once this connection is established, the personal control panel 170 of the mobile device 210 may be configured by the personal control server 120 based on the components 118(1) of the room 112(1), as described below.

The level of the ultrasound pairing signals 220 in the conference room 112(1) should be high enough so that the ultrasound signals can reach most mobile devices 210 in the conference room 112(1) with good signal-to-noise-ratio. Otherwise, the connection information cannot be successfully recovered by the mobile devices 210. In general, the ultrasound signals 220 used for detecting the proximity of a mobile device 210 typically have a limited frequency range, e.g., between 20 and 22 kilohertz (kHz).

In other embodiments, the video conference endpoint 116(1) may utilize other short-range wireless signals, such as, but not limited to, Bluetooth®, Zigbee, Z-Wave, infrared signals, radio frequency signals, etc., to detect a mobile device 210 within proximity of the video conference endpoint 104. In yet another embodiment, the video conference endpoint 116(1) may utilize location services or indoor positioning systems, like Wi-Fi® indoor positioning, to determine that a mobile device 210 is in proximity of the video conference endpoint 116(1) of the video conference room 112(1). In even further embodiments, the video conference endpoint 116(1) may utilize facial recognition techniques on video and/or images captured with cameras 200 to identify participants 172 located within the field of view of the cameras 200, and thus, in proximity of the video conference endpoint 116(1).

Returning to FIG. 1, the building control server 114 is disposed on premise of the building 110, and may be in communication with each of the rooms 112(1)-112(N) of the building 110, as well as the video conference endpoints 116(1)-116(N) and the room components 118(1)-118(N), respectively. As previously explained, instead of communicating with the rooms 112(1)-112(N), the video conference endpoints 116(1)-116(N), and/or the room components 118(1) 118(N) through the network 180, the building control server 114 may be configured to communicate with the rooms 112(1)-112(N), the video conference endpoints 116(1)-116(N), and/or the room components 118(1)-118(N) via other means, including, but not limited to, bridges, short range wireless signals (e.g., Bluetooth, Zigbee, Z-Wave, etc.), etc. The building control server 114 may be configured to change the state and/or settings of the components (e.g., cameras 200, display 202, loudspeakers 204, microphone array 206, etc.) of the video conference endpoints 116(1)-116(N) and the room components 118(1)-118(N) (e.g., projector, projector screen, lights, window shades, thermostat, etc.) of each room 112(1)-112(N), respectively.

Continuing to refer to FIG. 1, the personal control server 120 may be disposed remotely from the building 110 (i.e., in the cloud), and may be configured to communicate with building management server 130, the location server 140, the setting server 150, the meeting server 160, and the personal control panel 170. The person control server 120 is capable of configuring the personal control panel 170 to control the components of the video conference endpoints 116(1)-116(N) and the room components 1118(1)-118(N) of meeting rooms 112(1)-112(N), respectively, when the participant 172 of the personal control panel 170 is located within proximity of the respective video conference endpoint 116(1)-116(N) and/or located within the respective room 112(1)-112(N). The personal control server 120 may be configured to send signals and/or inputs received from the personal control panel 170 to the respective server 114, 130, 140, 150, 160. For example, as further explained below, when a participant 172 inputs a change of state of one of the room components 118(1) of video conference room 112(1), the personal control server 120 receives the input signal and relays that input signal so that the building control server 114 changes the state of the specific room component 118(1). Furthermore, the personal control server 120 may be configured to relay information and/or signals to the personal control panel 170 from the various other servers 114, 130, 140, 150, 160. For example, and as further explained below, when the building management server 130 detects that the state of one of the room components 118(1) of room 112(1) has changed, the personal control server 120 eventually receives a signal indicating the changed state of the room component 118(1) of room 112(1) and relays that information to the person control panel 170.

With continued reference to FIG. 1, the building management server 130, like the personal control server 120, may be disposed remotely from the building 110 (i.e., in the cloud), and may be configured to communicate with building control server 114 and the personal control server 120. In other embodiments, the building management server 130 is configured to further communicate with the location server 140, the setting server 150, and/or the meeting server 160. The building management server 130 may be configured to serve as an abstractor for each of the building control servers 114 of each of the buildings 110 of the environment 100. Furthermore, the building management server 130 may be configured to acquire, through the building control server 114, a current state and/or setting the components of the video conference endpoints 116(1)-116(N) and the room components 118(1)-118(N), as well as when the states and/or settings are Changed manually/physically (e.g., when a light is turned off or on via the physical switch located within the room 112(1)-112(N)). The building management server 130 may also be configured to maintain a database of the components disposed within each room 112(1)-112(N) of building 110. The building management server 130 may have knowledge of the physical meeting room 112(1)-112(N) address/identifiers, the control module types for each component of the video conference endpoints 116(1)-116(N) and each room component 118(1)-118(N), and the identifier/address of those control modules.

Still referring to FIG. 1, the location server 140 may also be disposed remotely from the building 110 (i.e., in the cloud), and may be configured to communicate with the personal control server 120 and the rooms 112(1)-112(N), and more specifically the video conference endpoints 116(1)-116(N) of the rooms 112(1)-112(N), respectively. The location server 140 is configured to determine when participants 172 are located within a room 112(1)-112(N) and configured to determine which one of the participants 172 are located in certain rooms 112(1)-112(N). The location server 140 is further configured to communicate to the personal control server 120 the location of participants 172 so that the personal control server 120 can determine for which rooms 112(1)-112(N) to configure the personal control panel 170. In one embodiment, the location server 140 may be queried by the personal control server 120 to determine a location of a participant 172 when the personal control server 120 is requested to configure the personal control panel 170. In addition, the location server 140 may be configured to build a map of the location of each of the participants 172 when attending various meetings within the building 110.

Furthermore, the setting server 150 may be disposed remotely from the building 110 (i.e., in the cloud), and may be configured to communicate with the personal control server 120. The setting server 150 may be configured to determine and maintain a participant's 172 personalized settings for each one of the rooms 112(1)-112(N). A participant's 172 personalized meeting room settings may be further based on the type of meeting to occur. For example, a participant 172 may have one set of personalized settings for room 112(1) based on a first meeting type (e.g., a video conference meeting), and a second set of personalized settings for room 112(1) based on a second meeting type (e.g., a local meeting with other participants that are all present in the meeting room 112(1)). The personal control server 120 may be configured to acquire and/or receive a participant's 172 personalized meeting room setting from the setting server 150 to preconfigure a room 112(1)-112(N) prior to the start of a scheduled meeting. The setting server 150 may also be configured to perform machine learning and text analytics on a scheduled meeting (i.e., on the title, agenda, participant list, etc.) to learn and/or determine the meeting type, the organizer of the meeting, the presenter of the meeting, and the subject matter of the meeting. This acquired information may be utilized when determining a pre-configuration of the components of a meeting room 112(1)-112(N).

Meeting server 160, as illustrated in FIG. 1, may also be disposed remotely from the building 110 (i.e., in the cloud), and may be configured to communicate with the personal control server 120. The meeting server 160 may be configured to operate and/or maintain scheduling services that allow the participants 172 to schedule meetings with one another. The meeting server 160 may include calendaring logic that enables the meeting server 160 to understand the concepts of dates and time. After scheduling a meeting, the meeting server 160 may store the scheduled meetings in meeting database 162. For each scheduled meeting, the meeting server 160 may store, in meeting database 162, information (e.g., the scheduled room 112(1)-112(N), participants 172, URLs, call numbers, etc.). The meeting server 160 may be further configured to store, in meeting database 162, the actions to be performed by each of the scheduled participants 172 within the meeting. In addition, the meeting server 160 may also be configured to store, in meeting database 162, changes made by the participants 72 to the room setup. Furthermore, meeting server 160 may be configured to communicate the meeting information to the personal control server 120 so that the personal control server 120 can query the setting server 140 to acquire a participant's 172 personalized room settings for the meeting rooms 112(1)-112(N) utilized for a meeting. In another embodiment, the meeting server 160 may be further configured to perform machine learning and text analytics on a scheduled meeting (i.e., on the title, agenda, participant list, etc.) to learn and/or determine the meeting type, the organizer of the meeting, the presenter of the meeting, and the subject matter of the meeting. This acquired information may be utilized when preconfiguring the components of a meeting room 112(1)-112(N). In yet another embodiment, the personal control server 120 may be configured to perform text analytics on the information of the a scheduled meeting to acquire thither information used to preconfigure the components of a meeting room 112(1)-112(N).

Figure 3:
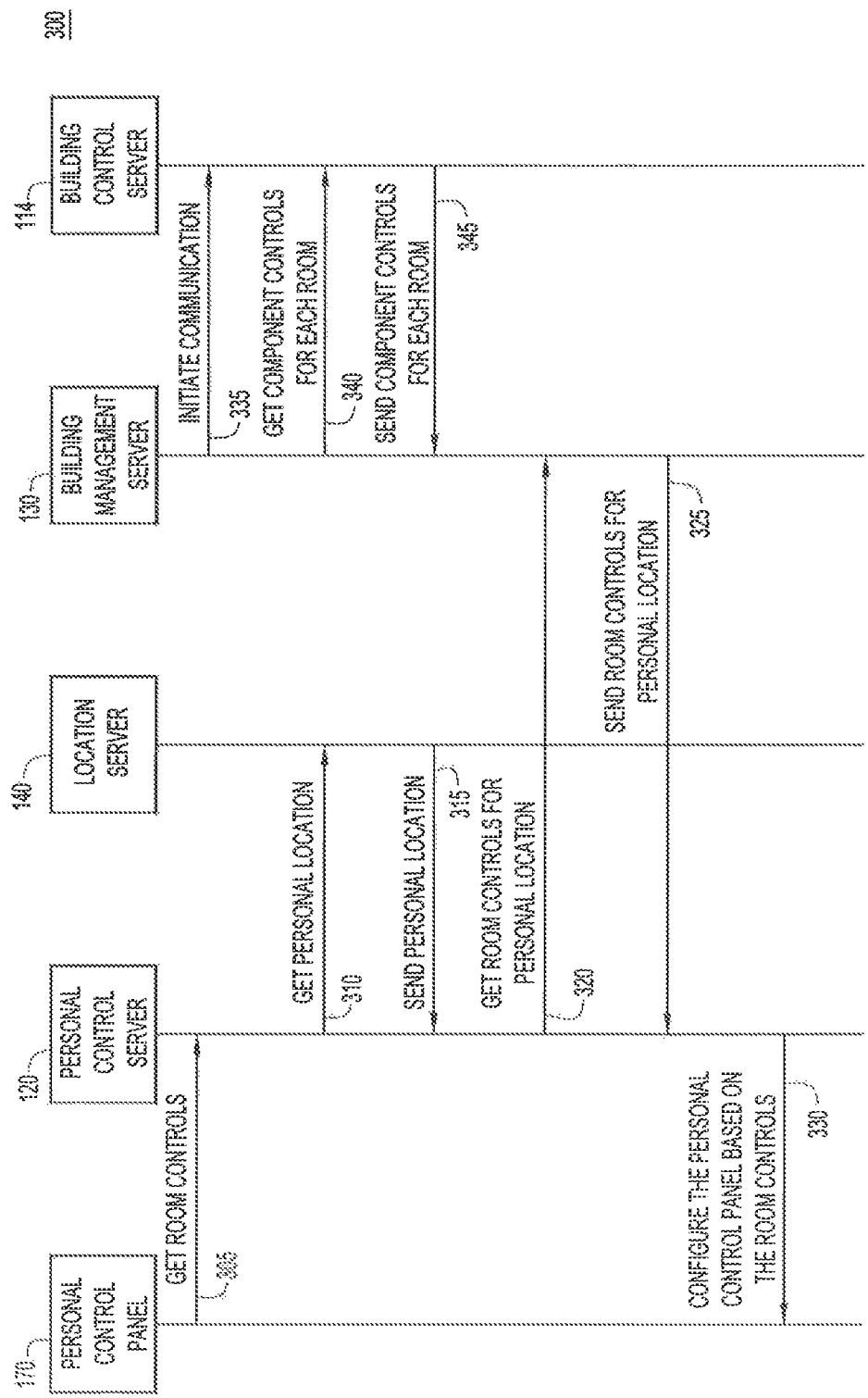
FIG. 3 is a sequence diagram depicting messages sent between, and operations performed by, various elements of the system for configuring the personal control panel, according to an example embodiment.

With reference to FIG. 3 and continued reference to FIGS. 1 and 2, illustrated is a sequence diagram 300 depicting, according to an embodiment, operations performed by the various devices and servers 114, 120, 130, 140, 170 for configuring the personalized control panel 170 to the components of a specific room 112(1) within the building 110. Initially, at 305, the personal control panel 170 of a participant 172 sends a request to the personal control server 120 asking for a set of room controls. This request may be initiated by the participant 172 of the personal control panel 170. At 310, the personal control server 120 may query the location server 140 for the location of the participant 172 (i.e., the meeting room 112(1)-112(N) in which the participant 172 is located). At 315, the location server 140 may return the location of the participant 172 to the personal control server 120. The personal control server 120 then, at 320, queries the building management for the information regarding the components of the meeting room 112(1)-112(N) in which the participant 172 is located so that the personal control server 120 can set up the personal control panel 170 to control the components of that meeting room 112(1)-112(N). At 325, the building management server 130 sends the information (e.g., component control module type, address, identification, etc.) regarding the components of the relevant room 112(1)-112(N) to the personal control serve 120. The personal control server 120, at 330, then configures the personal control panel 170 to control the components of the relevant room 112(1)-112(N). In another embodiment, the personal control server 120, at 330, may send the personal control panel 170 the information regarding the components of the relevant room 112(1)-112(N) so that the personal control panel 170 can configure itself.

Simultaneously, or prior to the operations performed at 305-330, the building management server 130, at 335, initiates communication with the building control server 114 of the building 110. At 340, the building management server 130 requests from the building control server 114 for the component control information for each room 112(1)-112(N) of the building 110. In other words, the building management server 130 requests information, from the building control server 114, for the components of the video conference endpoints 116(1)-116(N) of each room 112(1)-112(N), respectively, as well as the information for the room components 118(1)-118(N) of each room 112(1)-112(N), respectively. At 345, the building control server 114 sends to the building management server 130 the controllable components for each of the meeting rooms 112(1)-112(N) of the building 110. Thus, the building control server 114 sends, to the building management server 130, the components of the video conference endpoints 116(1)-116(N) of each room 112(1)-112(N), respectively, as well as the information for the room components 118(1)-118(N) of each room 112(1)-

112(N), respectively. The building management server 130 may store all of this information in a database so that, when queried by the personal control server 120, the building management server 130 can access the database for the information. In another embodiment, however, instead of storing the information in a database, the building management server 130 may query the building control server 114, like that at 340, when the building management server 130 is queried by the personal control server 120 for the component control information.

Figure 4:
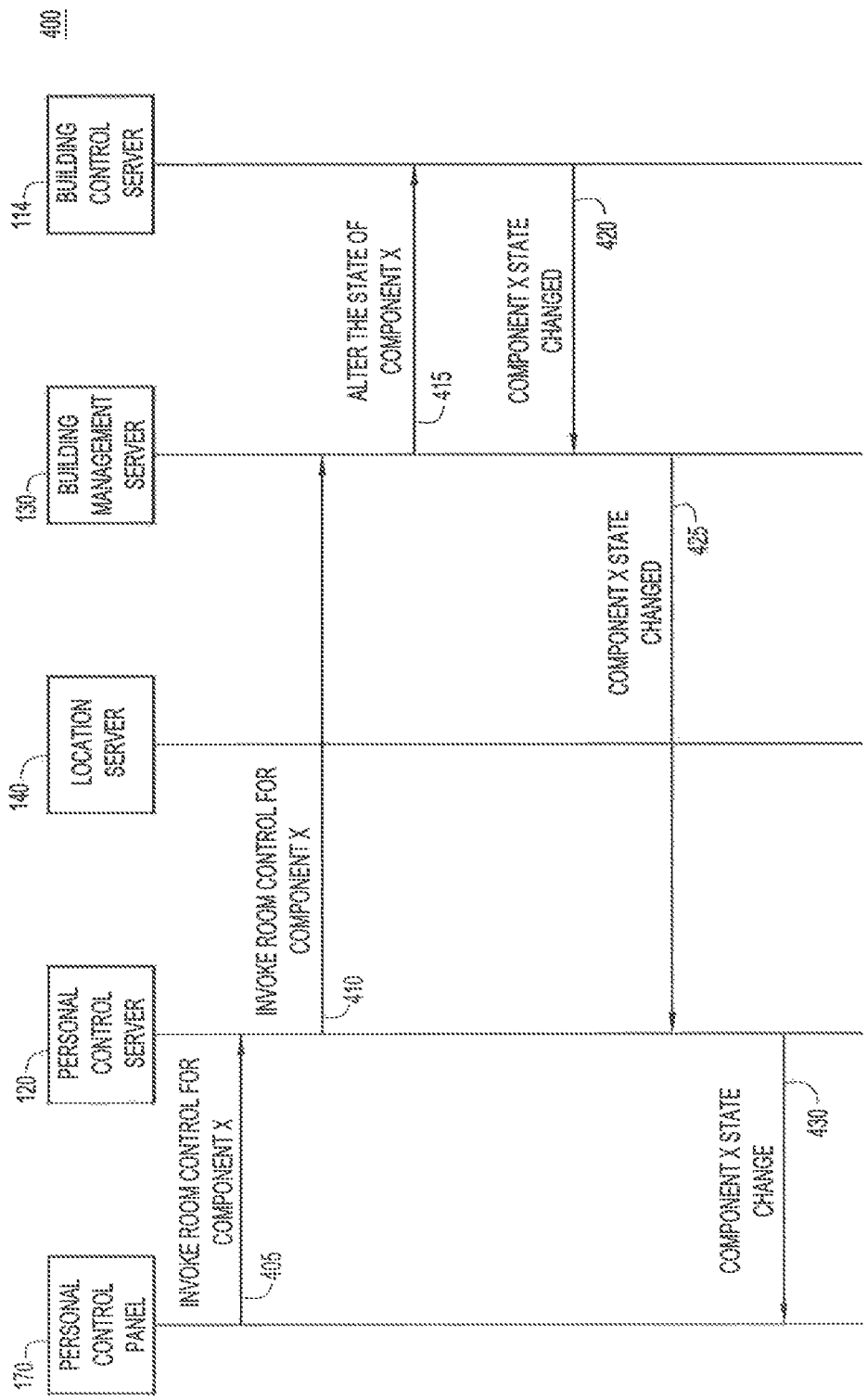
FIG. 4 is a sequence diagram depicting messages sent between, and operations performed by, various elements of the system for changing a state of a room component with the personal control panel, according to an example embodiment.

With reference to FIG. 4 and continued reference to FIGS. 1 and 2, illustrated is a sequence diagram 400 depicting, according to an embodiment, operations performed by the various devices and servers 114, 120, 130, 140, 170 of the system 100 for changing the state of a room component 118(1)-118(N) within a room 112(1)-112(N) through the personal control panel 170. Initially, at 405, a participant 172 operates the personal control panel 172 to indicate that the participant 172 wishes to change the operational state of a room component 118(1) within the room 112(1) in which the participant 172 is located. At 405, the personal control panel 170 sends a signal to the personal control server 120 that indicates that the participant 172 of the personal control panel 170 wishes to change the state of a particular room component 118(1). Depending on the component, the signal may also include information regarding the degree in which to change the state of the component. For example, some components, like some overhead lights, contain only binary states (i.e., an "on" state and an "off" state). However, other components, (e.g., blinds, dimmable lights, thermostat, etc.) contain varying degrees of states in which they can be placed. At 410, the personal control server 120 sends a signal to the building management server 130 that indicates to the building management server 130 the particular room component 118(1) of which that the participant 172 wishes to change the state. At 415, the building management server 130 sends a signal to the building control server 114 of the building 110 that contains the meeting room 112(1) with the particular room component 118(1). The signal sent at 415 instructs the building control server 114 to change the state of the particular room component 118(1) in accordance with what the participant 172 indicated on the personal control panel 170.

At 420, after the building control server 114 changes the state of the particular room component 118(1), the building control server 114 returns a signal to the building management server 130 that indicates that the current state of the particular room component 118(1) that has been changed. At 425, the building management server 130 sends a signal to the personal control server 120 that indicates that the particular room component 118(1) has been changed by the building control server 114. The personal control server 120 then, at 430, sends a signal to the personal control panel 170 that indicates that the state of the particular component 118(1) has been changed. This signal may also alter or reconfigure the personal control panel 170 to indicate or display on the personal control panel 170 the new current state of the particular component 118(1) that was recently changed. The operations illustrated in FIG. 4 may be equivalent or substantially similar to those for changing or altering the state of a component of the video conference endpoints 116(1)-116(N) of rooms 112(1)-112(N), respectively.

Figure 5:
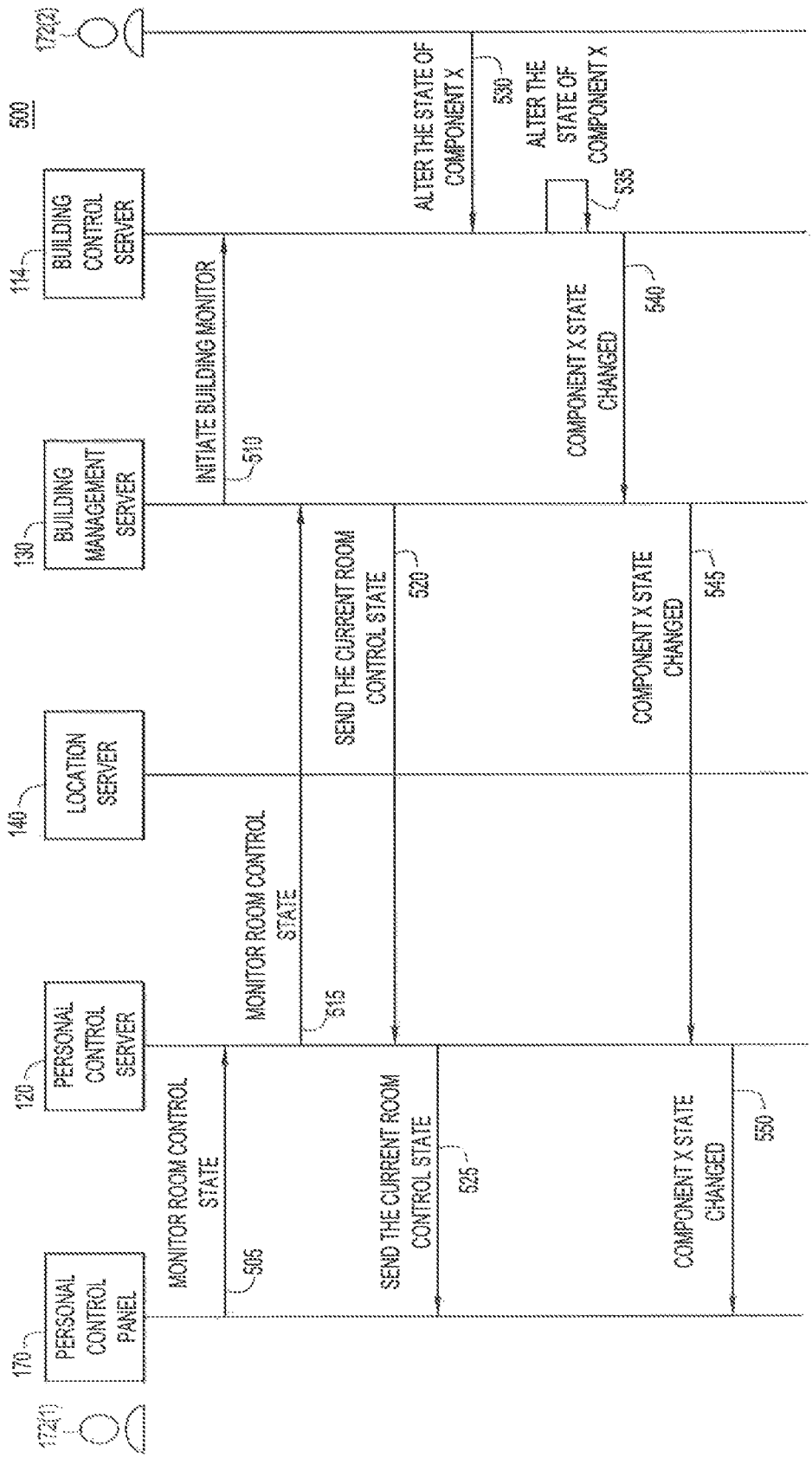
FIG. 5 is a sequence diagram depicting messages sent between, and operations performed by, various elements of the system for updating the state of a room component with the personal control panel, according to an example embodiment.

With reference to FIG. 5 and continued reference to FIGS. 1 and 2, illustrated is a sequence diagram 500 depicting, according to an embodiment, operations performed by the various devices and servers 114, 120, 130, 140, 170 of the system. 100 for acquiring the current state of room components 118(1)-118(N) within a room 112(1)-112(N). Initially, at 505, a first participant 172(1) operates the personal control panel 170 to acquire the current states of the room components 118(1) of the meeting room 112(1) in which the participant 172(1) is located. Thus, at 505, the personal control panel 170 sends a signal to the personal control server 120 that requests the current states of the room components 118(1) of the room 112(1) in which the first participant 172(1) is located. Simultaneously, or prior, to 505, at 510, the building management server 130 initiates the monitoring of the various rooms 112(1)-112(N) of the building 110, and their associated room components 118(1)-118(N), respectively. The building management server 130 monitors the states of the room components 118(1)-118(N) of building 110 through the building control server 114. At 515, after the personal control server 120 receives a request for the states of the room components 118(1), the personal control server 120 sends a request to the building management server 130 for the states of the room components 118(1) of the meeting room 112(1) in which the first participant 172(1) is located. At 520, the building management server 130 returns the current states of the requested room components 118(1) of the meeting room 112(1) to the personal control server 120. At 525, the personal control server 120 sends the personal control panel 170 the current states of the room components 118(1) for the meeting room 112(1) in which the first participant 172(1) is located. At 525, the personal control server 120 may reconfigure the personal control panel 170 to indicate/display the states of the room components 118(1) for the meeting room 112(1).

At a later point in time during the meeting in meeting room. 112(1), a second participant 172(2), at 530, may physically alter the state of a particular room component 118(1) in the meeting room 112(1). For example, instead of altering the state of a component through a personal control panel 170, like that of the operations 400 illustrated in FIG. 4, the second participant 172(2) may alter the state of the particular room component 118(1) through the physical controls located within the room 112(1). For example, the second participant 172(1) may have altered the state of the lights within the room 112(1) through the use of the physical light switch located within the room 112(1). This alteration of the state of the particular room component 118(1) is received by the building control server 114, which, at 535, stores an indication of the change of state of the particular room component 118(1), and, at 540, notifies the building management server 130 that the state of the particular room component 118(1) has been changed/altered. At 545, the building management server 130 sends a signal to the personal control server 120 that the state of the particular room component 118(1) has been altered from its previous state indicated at 520. At 550, the personal control server 120 sends a signal to the personal control panel 170 that indicates that the state of the particular room component 118(1) has been changed/altered. At 550, the personal control server 120 may also reconfigure the personal control panel 170 to display the updated state of the particular room component 118(1). The operations 500 illustrated in FIG. 5 may be equivalent or substantially similar to those for changing or altering the state of a component of the video conference endpoints 116(1)-116(N) of meeting rooms 112(1)-112(N), respectively.

Figure 6A:
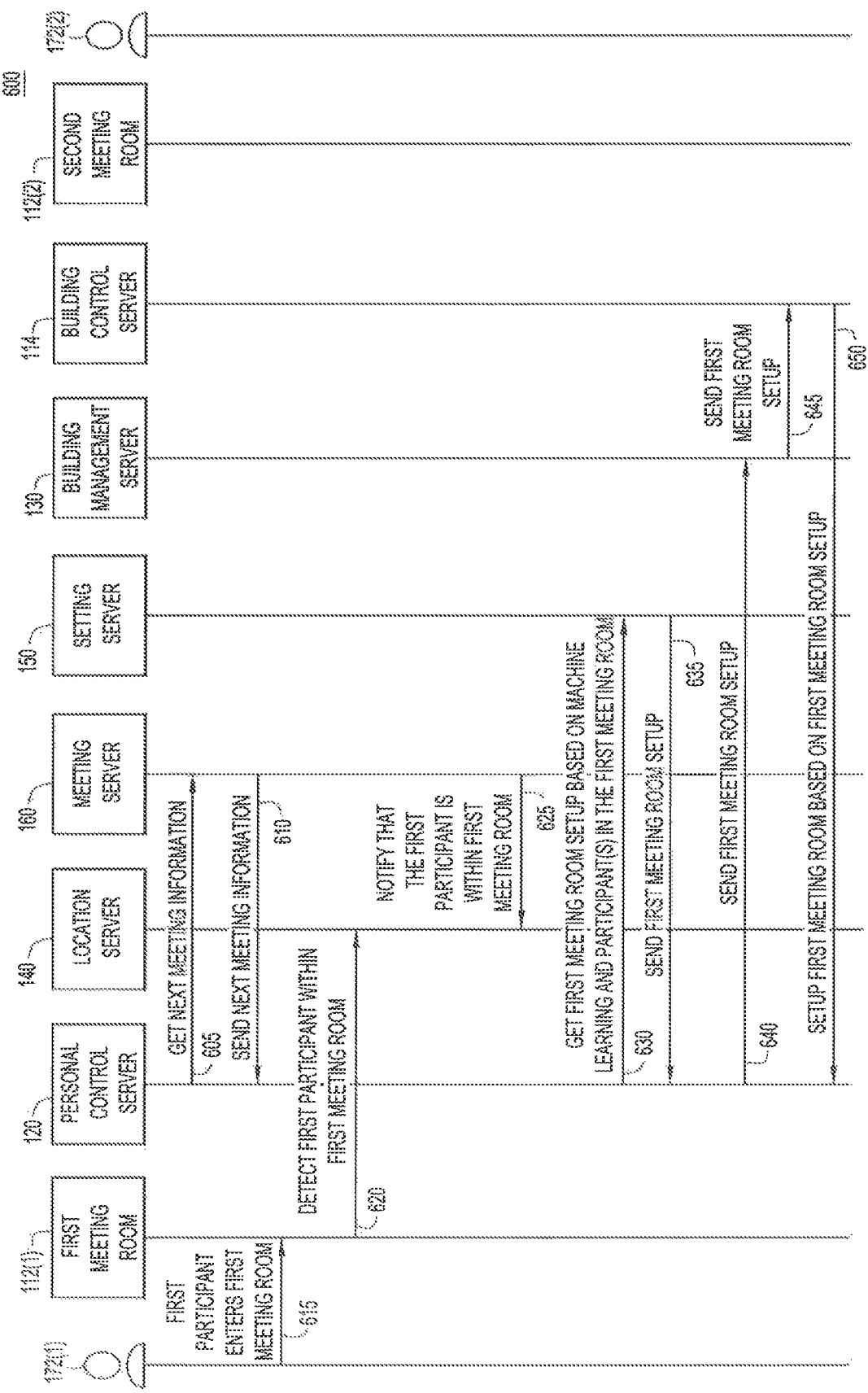
FIG. 6A is a sequence diagram depicting messages sent between, and operations performed by, various elements of the system for configuring the components of a video conference meeting room based on a detected proximity of a first participant at a first video conference meeting room and the context of a scheduled meeting, according to an example embodiment.
Figure 6B:
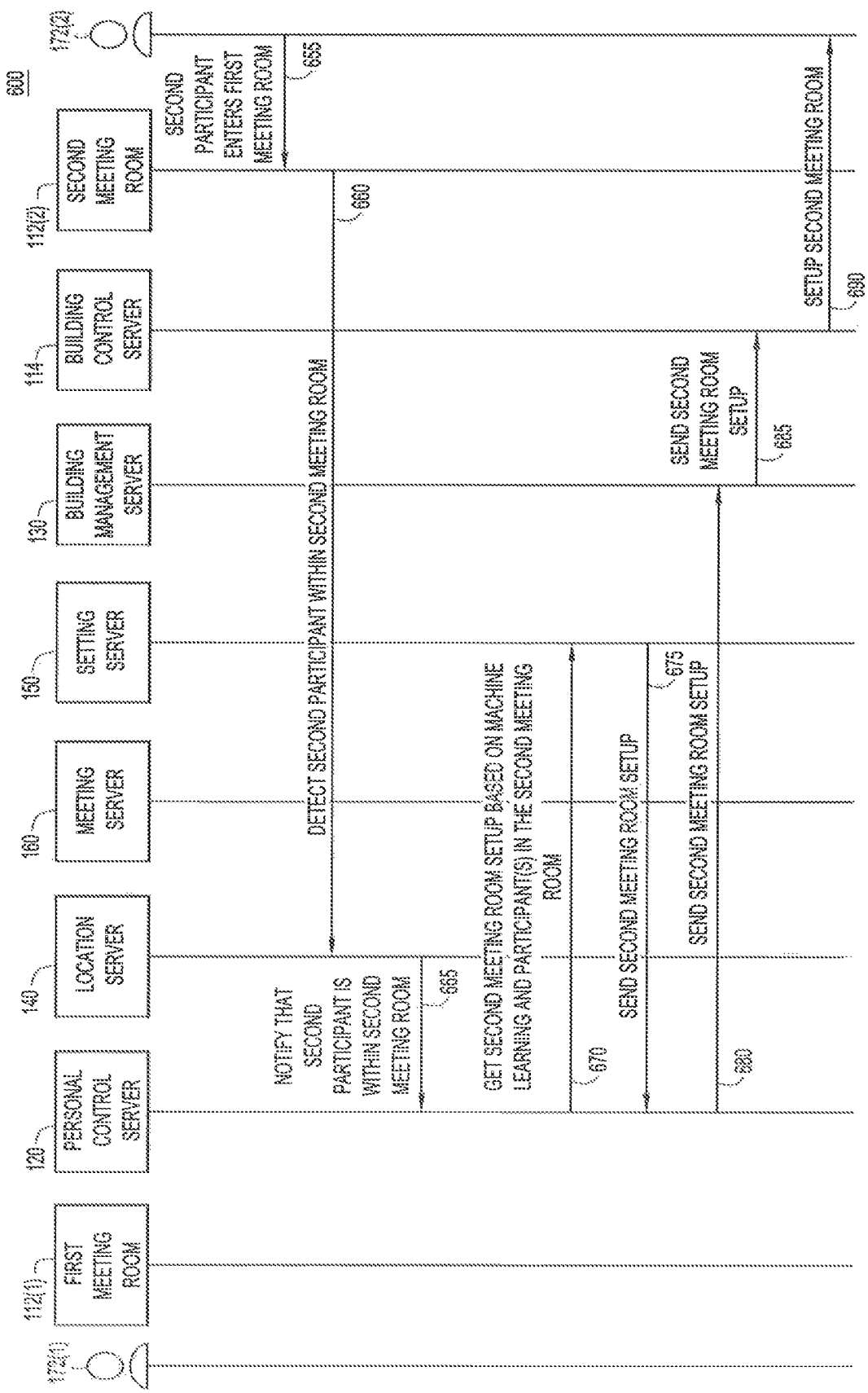
FIG. 6B is a sequence diagram depicting messages sent between, and operations performed by, various elements of the system for configuring the components of a video conference meeting room based on a detected proximity of a second participant at a second video conference meeting room, according to an example embodiment.

With reference to FIGS. 6A and 6B, and continued reference to FIGS. 1 and 2, illustrated is a sequence diagram 600 depicting, according to an embodiment, operations performed by the various devices and servers 114, 120, 130, 140, 150, 160, 170 of the system 100 for preconfiguring the components of the video conference endpoints 116(1)-116(2) and the room components 118(1)-418(N) of rooms 112(1)-112(N). As illustrated in FIG. 6A, initially, at 605, the personal control server 120 requests the meeting information from the meeting server 160. At 610, the meeting server 160 sends the meeting information of the next scheduled meeting to the personal control server 120. The meeting information may include the participants scheduled to participate in the scheduled meeting, the meeting room that was booked/scheduled for the scheduled meeting, as well as information regarding the type of the meeting that may be conducted.

At 615, the first participant 172(1), which may be the meeting organizer of the scheduled meeting, enters the first meeting room 112(1), and the proximity of the first participant 172(1) identified by the video conference endpoint 116(1) within the first meeting room 112(1). The first meeting room 112(1) may be the meeting room that was scheduled for the scheduled meeting, as conveyed to the personal control server 120 at 610 by the meeting server 160. At 620, the video conference endpoint 116(1) of the first meeting room 112(1) sends the location of the first participant 172(1) to the location server 140. At 625, the location server 140 notifies the personal control server 120 that the first participant 172(1) is located within the first meeting room 112(1). Alternatively, at 625, the personal control server 120 may query the location server 140 for the location of the first participant 172(1). At 630, the personal control server 120 sends a request to the setting server 150 for the meeting room setup for the first meeting room 112(1). The request sent at 630 may include the scheduled meeting information and the participants 172 located within the first meeting room 112(1). The setting server 130 may perform machine learning text analytics on the meeting information to determine the type of meeting that is scheduled to occur in the first meeting room 112(1), as well as information regarding which participant is scheduled to be the presenter of the meeting and/or which participant is the organizer of the meeting. The setting server 150 may further make a determination as to which participant's room setup preferences takes precedent over the others, or whether to determine a room setup based on a quorum of the participants located in the room. In some situations, when the organizing participant or the presenting participant of the scheduled meeting is present in the room, those participant's room setup preferences take precedent in determining the room setup. However, when the room only contains participants that are attending in the meeting, and are not scheduled to present, the setting server 150 may analyze each of these participants' room setup preferences to determine how to setup the room in a manner that best satisfies every participants' preferences. Thus, in determining a meeting room pre-configuration setup, the setting server factors in the meeting context information acquired from the machine learned information, as well as the meeting room setup preferences of the participants.

At 635, the setting server 150 sends the first room setup to the personal control server 120, where the setup is based on the factors described above. The information/data sent with regard to the first room setup may include the states in which the components of the video conference endpoint 116(1) and the room components 118(1) of the first meeting room 112(1) may be placed to comply with the first room setup. At 640, the personal control server 120 may send the first room setup to the building management server 130. At 645, the building management server 130 may instruct the building control server 114 as to the states to place each of the components of the video conference endpoint 116(1) and the room components 118(1) of the first meeting room 112(1). At 650, the building control server 114 may alter the state of the components of the video conference endpoint 116(1) and the room components 118(1) of the first meeting room 112(1) so that the first meeting room 112(1) is setup according to the preferences of the first participant 172(1) based on the meeting scheduled to occur in the first meeting room 112(1).

As illustrated in FIG. 6B, at 655, the second participant 172(2) of the scheduled meeting enters the second meeting room 112(2), and the proximity of the second participant 172(2) identified by the video conference endpoint 116(2) within the second meeting room 112(2). The second meeting room 112(2) may not have been indicated in the meeting information sent at 610 illustrated in FIG. 6A. Thus, the second participant 172(2) of the scheduled meeting may have decided, after the meeting was scheduled, to utilize the second meeting room 112(2) for participating in the meeting. At 660, the video conference endpoint 116(1) of the second meeting room 112(2) sends the location of the second participant 172(2) to the location server 140. At 665, the location server 140 notifies the personal control server 120 that the second participant 172(2) is located within the second meeting room 112(2). Alternatively, at 665, the personal control server 120 may query the location server 140 for the location of the second participant 172(2) just prior to the start of the scheduled meeting. At 670, the personal control server 120 sends a request to the setting server 150 for the meeting room setup for the second meeting room 112(2). The request sent at 670 may include the scheduled meeting information and the participants located within the second meeting room 112(2) so that the setting server 150 can make a determination, as explained above, as to the preferences utilized for setting up the second meeting room 112(2).

At 675, the setting server 150 sends the second room setup to the personal control server 120. The information/data sent with regard to the second room setup may include the states in which the components of the video conference endpoint 116(2) and the room components 118(2) of the second meeting room 112(2) may be placed to comply with the second room setup. At 680, the personal control server 120 may send the second room setup to the building management server 130. At 685, the building management server 130 may instruct the building control server 114 as to the states to place each of the components of the video conference endpoint 116(2) and the room components 118(2) of the second meeting room 112(2). At 690, the building control server 114 may alter the state of the components of the video conference endpoint 116(2) and the room components 118(2) of the second meeting room 112(2) so that the second meeting room 112(2) is set up according to the preferences of the second participant 172(2) based on the scheduled meeting despite the second meeting room 112(2) not being scheduled for the meeting.

Figure 7:
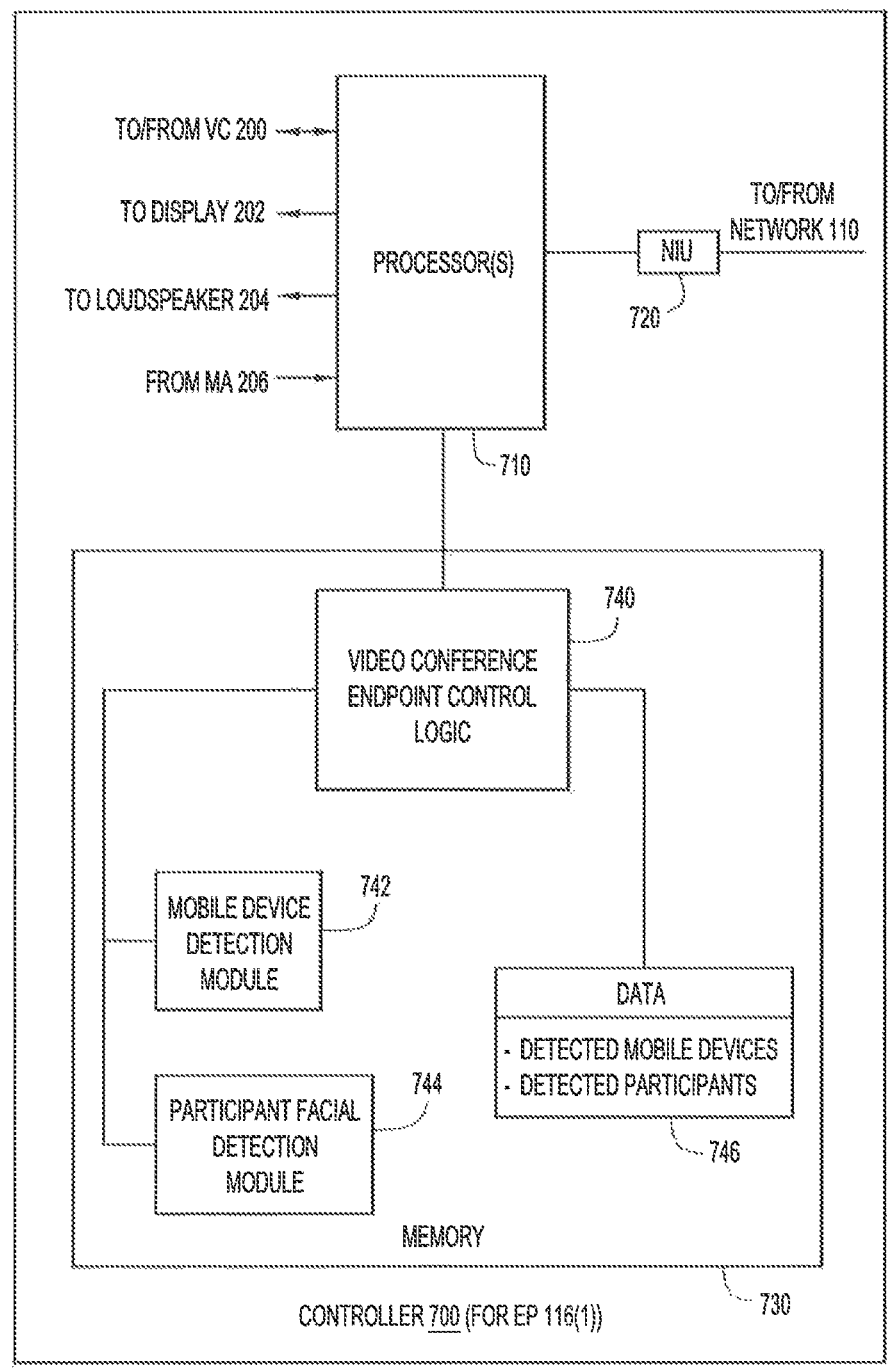
FIG. 7 is a block diagram of a controller of the video conference endpoint, wherein the controller is configured to perform the techniques presented herein, according to an example embodiment.

Reference is now made to FIG. 7, which shows an example block diagram of a controller 700 of a video conference endpoint 116(1) configured to perform the techniques described herein. There are numerous possible configurations for controller 700 and FIG. 7 is meant to be an example. Controller 700 includes a processor 710, a network interface unit 720, and memory 730. The network interface (I/F) unit (NIU) 720 is, for example, an Ethernet card or other interface device that allows the controller 700 to communicate over network 180. Network I/F unit 720 may include wired and/or wireless connection capability.

Processor 710 may include a collection of microcontrollers and/or microprocessors, for example, each configured to execute respective software instructions stored in the memory 730. The collection of microcontrollers may include, for example: a video controller to receive, send, and process video signals related to display 202 and video cameras 200; an audio processor to receive, send, and process audio signals related to loudspeakers 204 and MA 206; and a high-level controller to provide overall control. Processor 710 may send pan, tilt, and zoom commands to video cameras 200, which is responsive to the commands as would be appreciated by one of ordinary skill in the relevant art. Portions of memory 730 (and the instruction therein) may be integrated with processor 710. In the transmit direction, processor 710 encodes audio, video captured by MA 206/VC 200, encodes the captured audio/video into data packets, and causes the encoded data packets to be transmitted to network 180. In a receive direction, processor 710 decodes audio/video from data packets received from network 180 and causes the audio/video to be presented to local participants 172 via loudspeakers 204/display 202. As used herein, the terms "audio" and "sound" are synonymous and interchangeable.

The memory 730 may include read only memory (ROM), random access memory (RAM), magnetic disk storage media devices, optical storage media devices, flash memory devices, electrical, optical, or other physical/tangible (e.g., non-transitory) memory storage devices. Thus, in general, the memory 730 may comprise one or more computer readable storage media (e.g., a memory device) encoded with software comprising computer executable instructions and when the software is executed (by the processor 710) it is operable to perform the operations described herein. For example, the memory 730 stores or is encoded with instructions for video conference endpoint control logic 740 to perform overall control of endpoint 116(1) and operations described herein for detecting participants in proximity of the video conference endpoint 116(1). Video conference endpoint control logic 740 includes a mobile device detection module 742 to detect mobile devices in proximity of the video conference endpoint 116(1) using ultrasound signals or short range wireless signals and participant facial detection module 744 detect the faces of the participants 172 located in proximity of the video conference endpoint 116(1) by analyzing the images and videos captured with the cameras 200.

In addition, memory 730 stores data 746 used and generated by logic/modules 740, 742, 744, including, but not limited to: information associated with detected mobile devices (e.g., mobile device identification, authentication, etc.); and information associated with the detected participants (e.g., participant identification, participant facial information, etc.).

Figure 8:
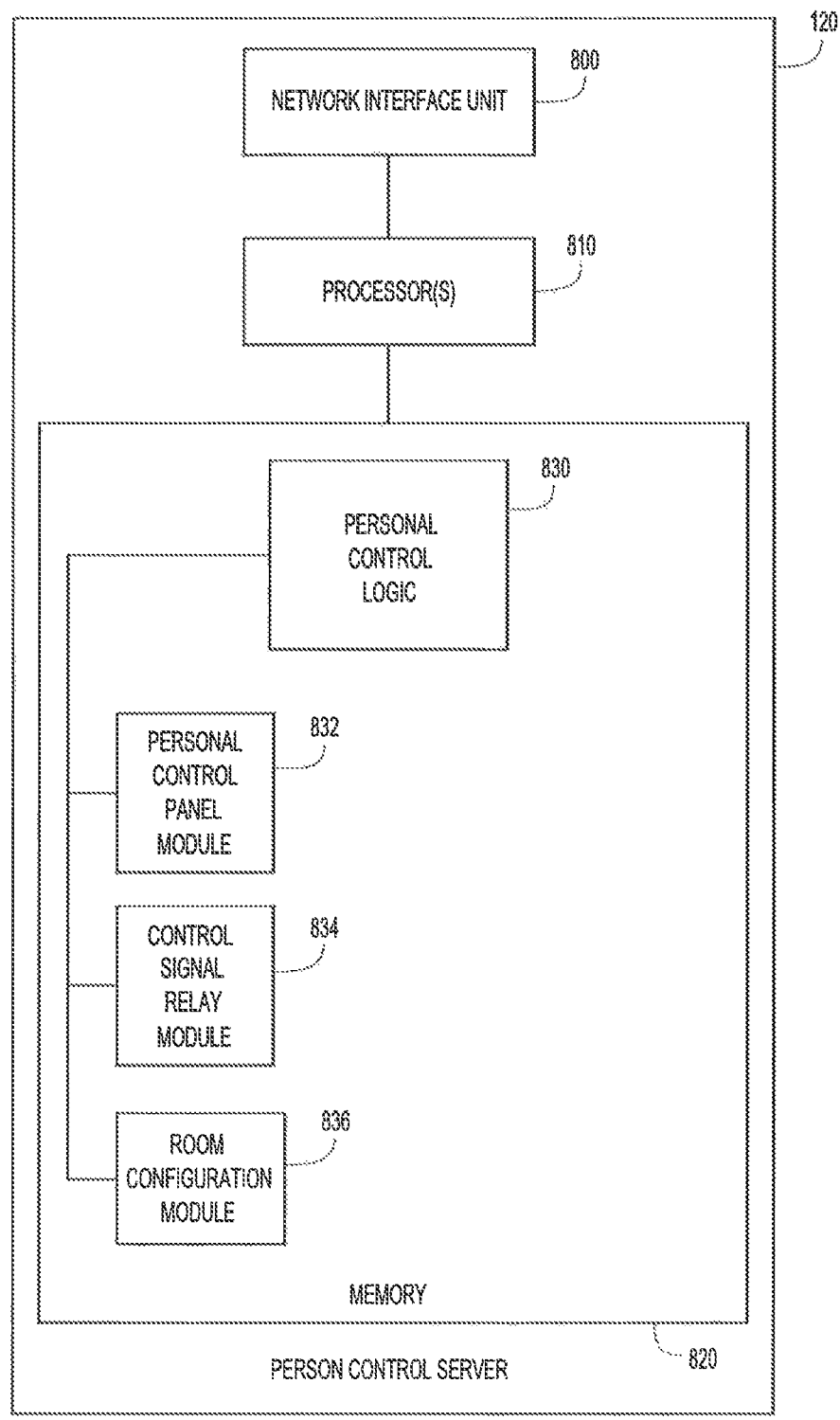
FIG. 8 is a block diagram of the personal control server illustrated in FIG. 1, wherein the personal control service is configured to dynamically configure the personal control panel, in accordance with an example embodiment.

Illustrated in FIG. 8 is an example block diagram of the personal control server 120 configured to perform the techniques presented herein. As shown, the personal control server 120 includes a network interface unit 800, one or more processor(s) 810, and a memory 820. The network interface unit 800 is configured to enable network communications over networks and may include a plurality of ports at which it can receive incoming network traffic and from which it can send outgoing network traffic. While conceptually illustrated as a "network interface unit," it will be appreciated that a physical device may contain more than one network interface unit or type of interface to communicate with other devices within a network. For example, network interface unit 800 may include a wireless network interface unit to facilitate wireless communication over networks.

The processor(s) 810 may be embodied by one or more microprocessors or microcontrollers, and execute software instructions stored in memory 820 for the personal control logic 830, personal control panel module 832, control signal relay module 834, and room configuration module 836 in accordance with the techniques presented herein in connection with FIGS. 1-5, 6A, and 6B.

Memory 820 may include one or more computer readable storage media that may include ROM, RAM, magnetic disk storage media devices, optical storage media devices, flash memory devices, electrical, optical, or other physical/tangible memory storage devices.

Thus, in general, the memory 820 may include one or more tangible (e.g., non-transitory) computer readable storage media (e.g., a memory device) encoded with software comprising computer executable instructions, and when the software is executed by the processor(s) 810, the processor(s) 810 are operable to perform the operations described herein by executing instructions associated with personal control logic 830, personal control panel module 832, control signal relay module 834, and room configuration module 836. In other approaches, the personal control logic 830, personal control panel module 832, control signal relay module 834, and room configuration module 836 may be stored remotely, external to the personal control server 120, but accessible by the processor(s) 810. As illustrated, the personal control logic 830 performs overall control of personal control server 120 and includes personal control panel module 832, control signal relay module 834, and room configuration module 836. The personal control panel module 832 enables the personal control server 120 to configure and/or reconfigure each personal control panel 170 to control various components of a room based on the location of the participant 172 in possession of the personal control panel 170. The control signal relay module 834 further enables the personal control server 120 to receive and relay control signals from each personal control panel 170 to the building management server 130, as well as receive and convey component state and control information from the building management server 130 to the personal control panel 170. The room configuration module 836 enables the personal control server 120 to receive meeting information from the meeting server 160 and convey the participants 172, meeting information, and room identification to the setting server 150 in order to acquire a preferred room setup for the components of the rooms utilized during a meeting.

The functions of the processor(s) 810 may be implemented by logic encoded in one or more tangible computer readable storage media or devices (e.g., storage devices compact discs, digital video discs, flash memory drives, etc. and embedded logic such as an ASIC, digital signal processor instructions, software that is executed by a processor, etc.).

While FIG. 8 shows that the personal control server 120 may be embodied as a dedicated physical device, it should be understand that the functions of the personal control server 120 may be embodied as software running in a data center/cloud computing system, together with numerous other software applications.

Figure 9:
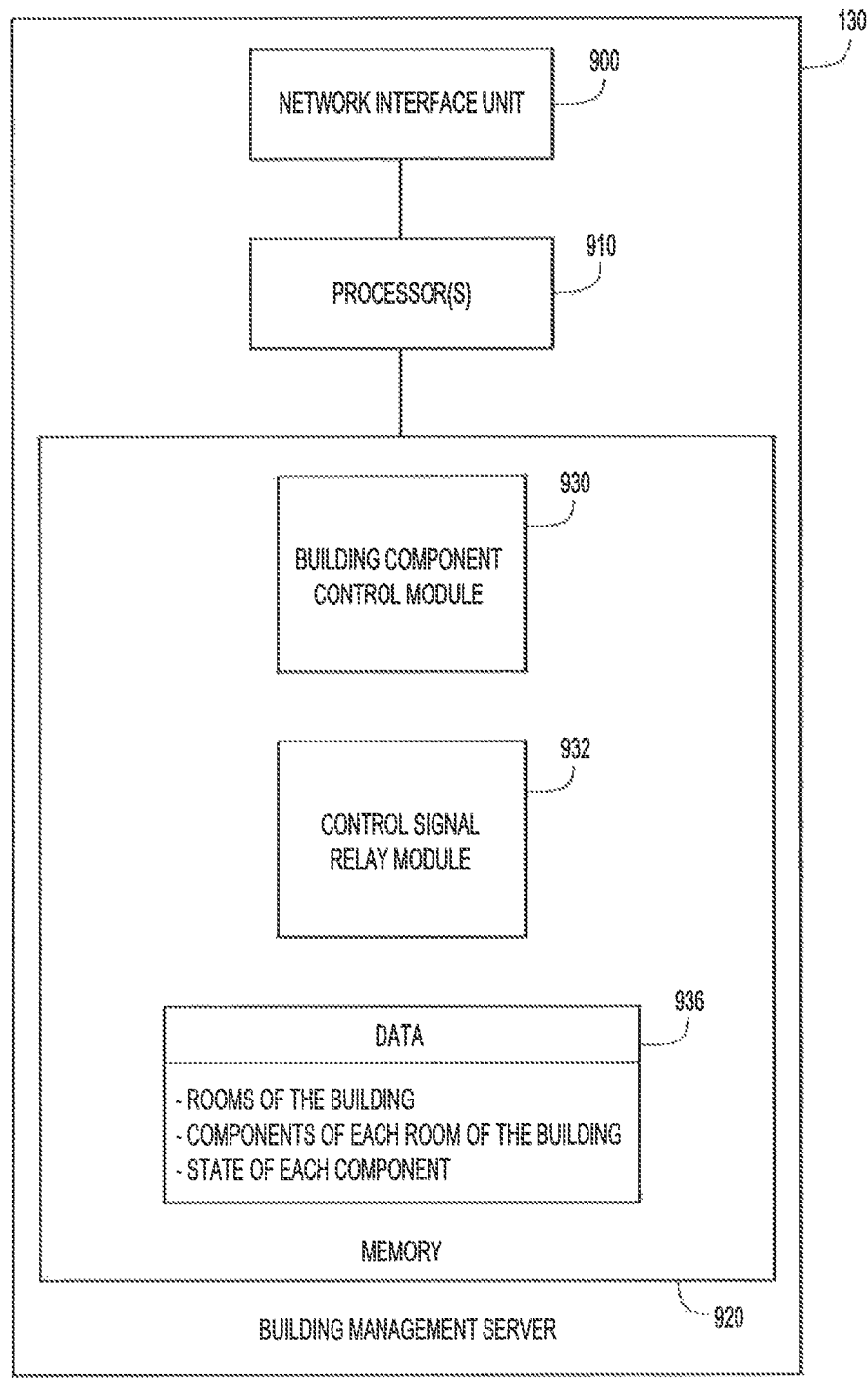
FIG. 9 is a block diagram of the building management server illustrated in FIG. 1, wherein the building management service is configured to alter the state of room components of the video conference meeting rooms, in accordance with an example embodiment.

Illustrated in FIG. 9 is an example block diagram of the building management server 130 configured to perform the techniques presented herein. As shown, the building management server 130 includes a network interface unit 900, one or more processor(s) 910, and a memory 920. The network interface unit 900 is configured to enable network communications over networks and may include a plurality of ports at which it can receive incoming network traffic and from which it can send outgoing network traffic. While conceptually illustrated as a "network interface unit," it will be appreciated that a physical device may contain more than one network interface unit or type of interface to communicate with other devices within a network. For example, network interface unit 900 may include a wireless network interface unit to facilitate wireless communication over networks.

The processor(s) 910 may be embodied by one or more microprocessors or microcontrollers, and execute software instructions stored in memory 920 for the building component control module 930, control signal relay module 932, and for accessing and storing data 934 in accordance with the techniques presented herein in connection with FIGS. 1-5, 6A, and 6B.

Memory 920 may include one or more computer readable storage media that may include ROM, RAM, magnetic disk storage media devices, optical storage media devices, flash memory devices, electrical, optical, or other physical/tangible memory storage devices.

Thus, in general, the memory 920 may include one or more tangible (e.g., non-transitory) computer readable storage media (e.g., a memory device) encoded with software comprising computer executable instructions, and when the software is executed by the processor(s) 910, the processor(s) 910 are operable to perform the operations described herein by executing instructions associated with building component control module 930 and control signal relay module 932. In other approaches, the building component control module 930 and the control signal relay module 932 may be stored remotely, external to the building management server 130, but accessible by the processor(s) 910. The building component control module 930 enables the building management server 130 to send command signals to the building control server 114 of a building 110 that causes the building control server 114 to alter the state of the components of the rooms 112(1)-112(N) of the building 110. The building component control module 930 further enables the building management server 130 to monitor the states of the components of the rooms 112(1)-112(N) of the building 110 through the building control server 114. The control signal relay module 932 further enables the building management server 130 to receive control signals from the personal control serve 120, as well as send the component state and control information to the personal control server 120.

In addition, memory 920 stores data 934 used and generated by modules 930, 932, including, but not limited to; rooms 112(1)-112(N) of a building 114, components of the video conference endpoints 116(1)-116(N) of the rooms 112(1)-112(N), respectively, and room components 118(1)-118(N) of the rooms 112(1)-112(N), respectively, and the state of each of the components of the building. In other approaches, the data 934 may be stored remotely, external to the building management server 130, but accessible by the processor(s) 910.

The functions of the processor(s) 910 may be implemented by logic encoded in one or more tangible computer readable storage media or devices (e.g., storage devices compact discs, digital video discs, flash memory drives, etc. and embedded logic such as an ASIC, digital signal processor instructions, software that is executed by a processor, etc.).

While FIG. 9 shows that the building management server 130 may be embodied as a dedicated physical device, it should be understand that the functions of the building management server 130 may be embodied as software running in a data center/cloud computing system, together with numerous other software applications.

Figure 10:
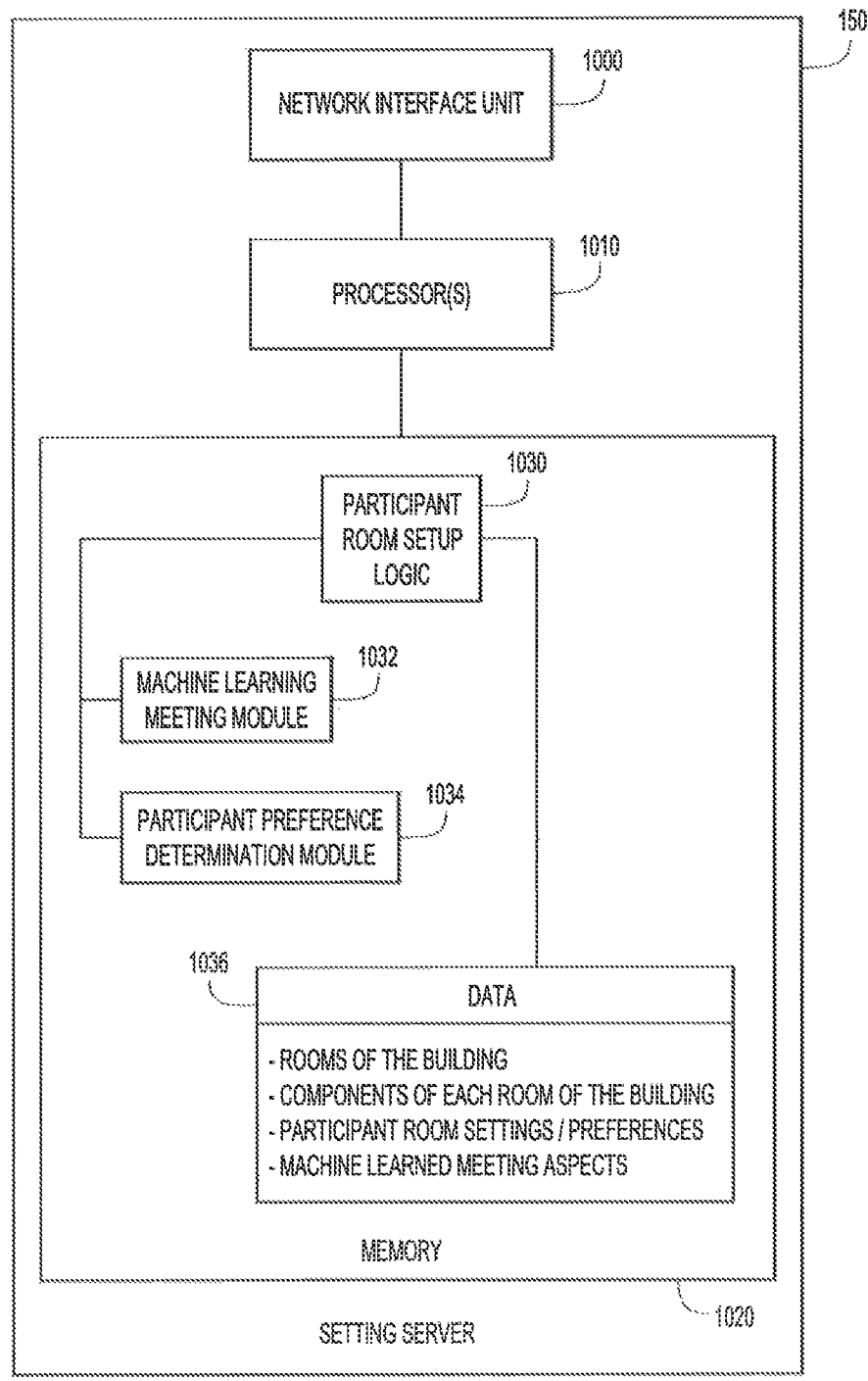
FIG. 10 is a block diagram of the setting server illustrated in FIG. 1, wherein the setting server is configured to determine the configuration of the room components of a video conference meeting room based on meeting contexts, in accordance with an example embodiment.

Illustrated in FIG. 10 is an example block diagram of the setting server 150 configured to perform the techniques presented herein. As shown, the setting server 150 includes a network interface unit 1000, one or more processor(s) 1010, and a memory 1020. The network interface unit 1000 is configured to enable network communications over networks and may include a plurality of ports at which it can receive incoming network traffic and from which it can send outgoing network traffic. While conceptually illustrated as a "network interface unit," it will be appreciated that a physical device may contain more than one network interface unit or type of interface to communicate with other devices within a network. For example, network interface unit 1000 may include a wireless network interface unit to facilitate wireless communication over networks.

The processor(s) 1010 may be embodied by one or more microprocessors or microcontrollers, and execute software instructions stored in memory 1020 for the building participant room setup logic 1030, machine learning meeting module 1032, and participant preference determination module 1034, and for accessing and storing data 1036 in accordance with the techniques presented herein in connection with FIGS. 1-5, 6A, and 6B.

Memory 1020 may include one or more computer readable storage media that may include ROM, RAM, magnetic disk storage media devices, optical storage media devices, flash memory devices, electrical, optical, or other physical/tangible memory storage devices.

Thus, in general, the memory 1020 may include one or more tangible (e.g., non-transitory) computer readable storage media (e.g., a memory device) encoded with software comprising computer executable instructions, and when the software is executed by the processor(s) 1010, the processor(s) 1010 are operable to perform the operations described herein by executing instructions associated with participant room setup logic 1030, machine learning meeting module 1032, and participant preference determination module 1034. In other approaches, participant room setup logic 1030, machine leaning meeting module 1032, and participant preference determination module 1034 may be stored remotely, external to the setting server 150, but accessible by the processor(s) 1010. As illustrated, the participant room setup logic 1030 includes machine learning meeting module 1032 and participant preference determination module 1034. The machine learning meeting module 1032 enables the setting server 150 to use, among other machine learning techniques, text analytics on the meeting information to acquire meeting context information, including, but not limited to, the type of meeting (e.g., video conference, local meeting, etc.), the participants of the meeting, the organizer of the meeting, and the presenter of the meeting. The participant preference determination module 1034 enables the setting server 150 to make a determination as to the which participant's room setup preferences take precedent, if any, for determining the meeting room setup of the components of the room. The participant preference determination module 1034 further enables the setting server 150 to, when no participant's meeting room setup preferences take precedent (e.g., none of the participants of a room are an organizer or presenter), combine the meeting room preferences of the participants of the meeting room to create a meeting room component setup that best suits all of the participants of the particular meeting room. The participant preference determination module 1034 may also enable the setting server to alter a participant's preferred meeting room setup based on the actions performed by the participant during a meeting (e.g., the participant changing the state of a preconfigured component). These alterations are saved and applied for the next time the setting server 150 analyzes that participant's preferred meeting room setup.

In addition, memory 1020 stores data 1036 used and generated by logic/modules 1030, 1032, 1034, including, but not limited to: meeting rooms of the building; components of each meeting room of the building; participant meeting room pre-configuration settings; and machine learned meeting aspects (e.g., specific terms and information that indicate identifiable information for the meeting). In other approaches, the data 1036 may be stored remotely, external to the setting server 150, but accessible by the processor(s) 1010.

The functions of the processor(s) 1010 may be implemented by logic encoded in one or more tangible computer readable storage media or devices (e.g., storage devices compact discs, digital video discs, flash memory drives, etc. and embedded logic such as an ASIC, digital signal processor instructions, software that is executed by a processor, etc.).

While FIG. 10 shows that the setting server 150 may be embodied as a dedicated physical device, it should be understand that the functions of the setting server 150 may be embodied as software running in a data center/cloud computing system, together with numerous other software applications.

Figure 11A:
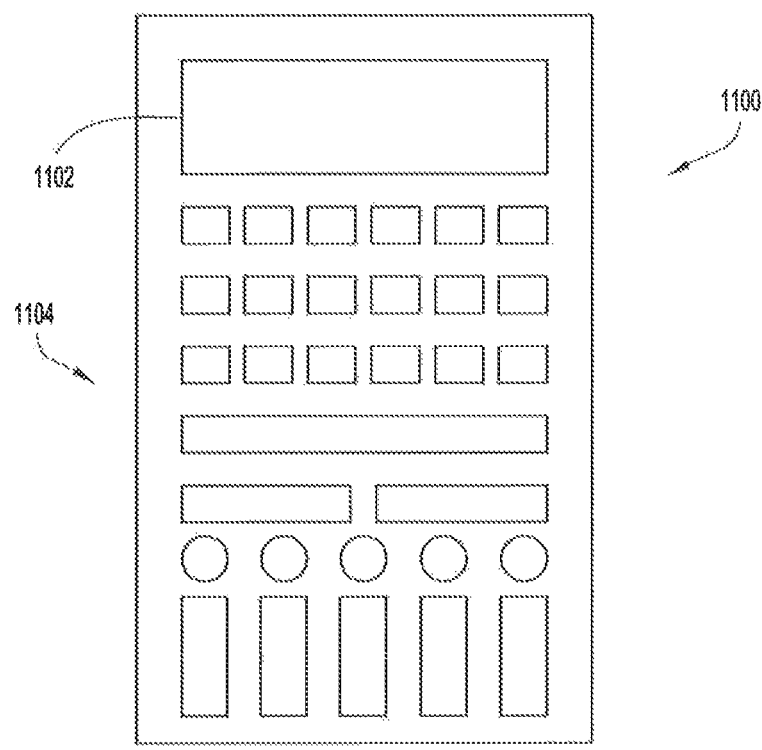
FIG. 11A is an illustration of a first embodiment of an example personal control panel, where the first embodiment of the personal control panel is a wireless remote control device with push buttons and a display.

With reference to FIG. 11A and continued reference to FIG. 1, depicted is a first embodiment of a personal control panel 170, where the personal control panel 170 is embodied as a wireless remote control device 1100. As illustrated, the remote control device 1100 may have a display 1102 and a series of buttons 1104. The remote control device 1100 may be capable of two way wireless communication with the personal control server 120 as explained above. The display 1102 may show the current room 112(1)-112(N) in which the remote control 1100 may be located. When located within a room 112(1)-112(N), the personal control server 120 may map the buttons 1104 to the various room components 118(1)-118(N). Where each button 1104 that has been mapped to a controllable room component 118(1)-118(N) may be illuminated on the remote control device 1100. For example, the "+/−" button for both volume and light may be illuminated, while a "presentation" button may not be illuminated when the room in which the remote control device 1100 is located does not contain presentation equipment. (i.e., projector, projector screen, etc.). It will be appreciated that the remote control device 1100 illustrated in FIG. 11A is only one example of a remote control device of the personal control panel 170, and other remote control devices may serve as the personal control panel 170, where the other remote control devices may be in any form or shape with or without a display and a series of buttons.

Figure 11B:
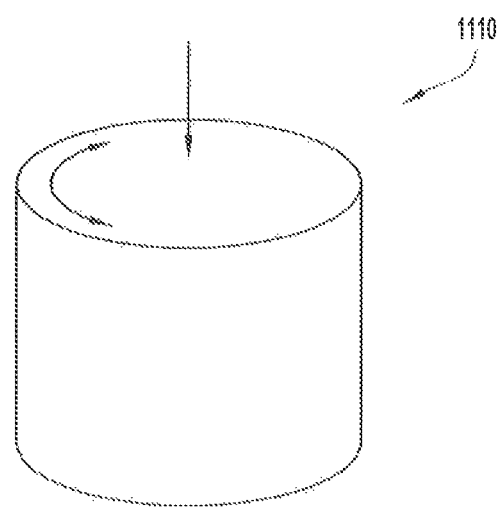
FIG. 11B is an illustration of a second embodiment of an example personal control panel, where the second embodiment of the personal control panel is a wireless button with push and turn capabilities.

With reference to FIG. 11B and reference to FIG. 1, depicted is a second embodiment of a personal control panel 170, where the personal control panel 170 is embodied as a wireless button 1110. As illustrated, the button 1110 may have rotational capabilities (i.e., a portion of the button 1110 can be rotated) and push capabilities (i.e., the button 1110 can be clicked or depressed). The button 1110 may be capable of wireless communication (e.g., Bluetooth) with the personal control server 120 as explained above. The button 1110 may be equipped with a light source(s) that illuminates the button 1110 with different colors and illumination patterns. In one example, a single click/push/depression of the button 1110 may place the button 1110 into an operational mode that shows a state/function of a certain controllable room component 118(1)-118(N) within a room 112(1)-112(N), as well as enabling the button 1110 to control the room component 118(1)-118(N). Each room component 118(1)-118(N) may be represented by a predesignated color. After each click/push/depression of the button 1110, the button 1110 may be illuminated with the color that corresponds or represents the component that the button 1110 is then configured to control. For example, after a first click/push/depression of the button 1110, the button 1110 may be illuminated with a yellow color, which may represent control of the lights within a room. Once in control of a room component 118(1)-118(N), rotation of the button 1110 may alter the state of the room component 118(1)-118(N) (e.g., dimming the lights within the room). Subsequent double clicks/pushes/depressions of the button 1110 may alter or change the operational mode of the button 1110 to control a different room component 118(1)-118(N) within a room 112(1)-112(N). At this time, the color of the button 1110 may also be changed to that of the different room component 118(1)-118(N) of which the button 1110 is in control.

Figure 11C:
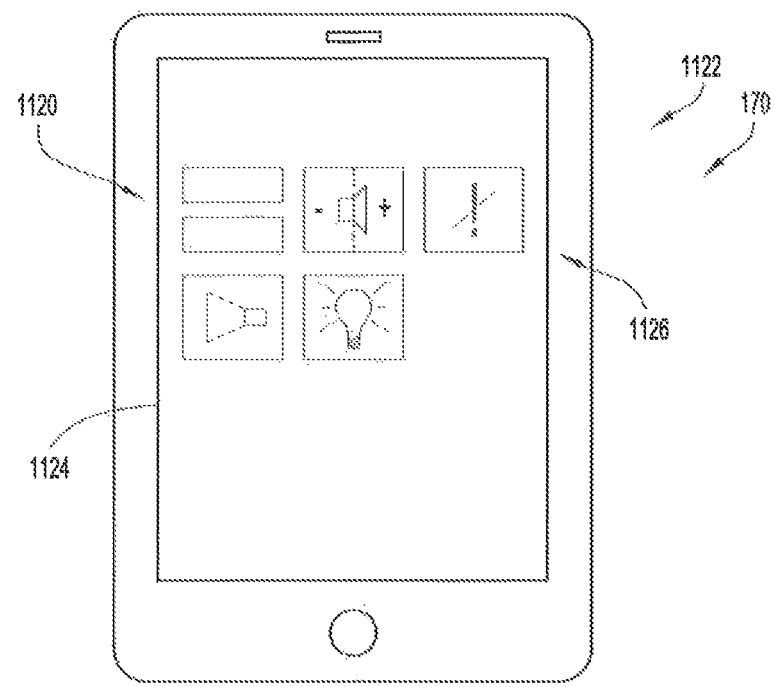
FIG. 11C is an illustration of a third embodiment of an example personal control panel, where the third embodiment of the personal control panel is software application operable on a mobile electronic device.

With reference to FIG. 11C and to FIG. 1, depicted is a third embodiment of a personal control panel 170, where the personal control panel 170 is embodied as a software application 1120 running on a mobile electronic device 1122 (e.g., smartphone, tablet, laptop, etc.). The mobile electronic device 1122 may have a display 1124, such as a touchscreen display. The mobile electronic device 1122 may be configured to communicate wired or wirelessly with the person control server 120, as explained above, to enable the personal control server 120 to manage the software application 1120 on the mobile electronic device 1122. The display 1124 may be configured to display functional icons associated with the software application 1120 when operated by the mobile electronic device 1122. The software application 1120 may be configured to present numerous icons 1126 that operate as buttons via the touchscreen display 1124. The personal control server 120 may be configured to manage and select which icons 1126 to present within the software application 1120 based on the room components 118(1)-118(N) within the room 112(1)-112(N) in which the mobile electronic device 1122 is located. In the embodiment illustrated, the icons 1126 illustrated are configured to manage the volume, the lights, a microphone, and a projector/display screen. In one example, the software application 1120 may be automatically opened and displayed on the display 1124 when the mobile electronic device 1122 is initially detected within a room 112(1)-112(N). Furthermore, the software application 1120 may be capable of receiving voice commands through a microphone equipped on the mobile electronic device 1122. The mobile electronic device 1122 may be configured to receive voice commands that change the state of a room component 118(1)-118(N) even when the mobile electronic device 1122 is in a "locked" or "idle" mode.

Figure 11D:
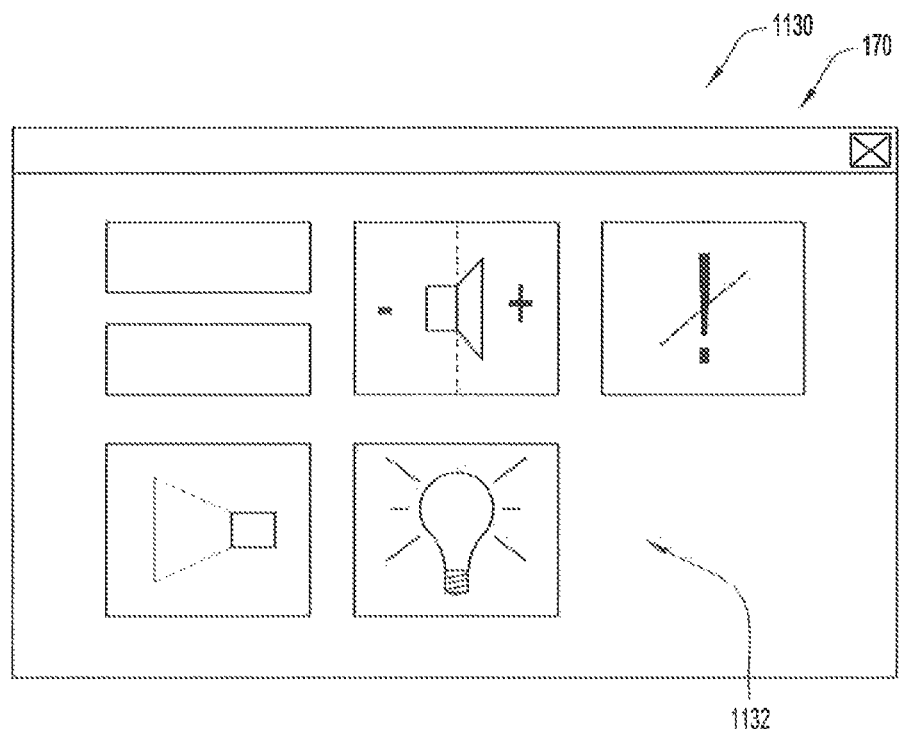
FIG. 11D is an illustration of a fourth embodiment of an example personal control panel, where the fourth embodiment of the personal control panel is a web browser operating on an electronic device.

With reference to FIG. 11D, depicted is a fourth embodiment of a personal control panel 170, where the personal control panel 170 is embodied as a web browser 1130 operated on an electronic device (not illustrated). The electronic device may be configured to communicate wired or wirelessly with the personal control server 120 to enable the personal control server 120 to manage the web browser 1130 operated on the electronic device. The web browser 1130 may be configured to present numerous icons 1132 that operate as buttons that may be selected or clicked on the electronic device. The personal control server 120 may be configured to manage and select which icons 1132 to present within the web browser 1130 based on the room components 118(1)-118(N) within the room 112(1)-112(N) in which the electronic device is located. In the embodiment illustrated in FIG. 11D, the icons 1132 illustrated are configured to manage the volume, the lights, a microphone, and a projector/display screen within the room 112(1)-112(N). Similar to the software application 1120, the web browser 1130 may be capable of receiving voice commands through a microphone equipped on the electronic device, where the voice commands may be capable of changing the state of a room component 118(1)-118(N).

Figure 12:
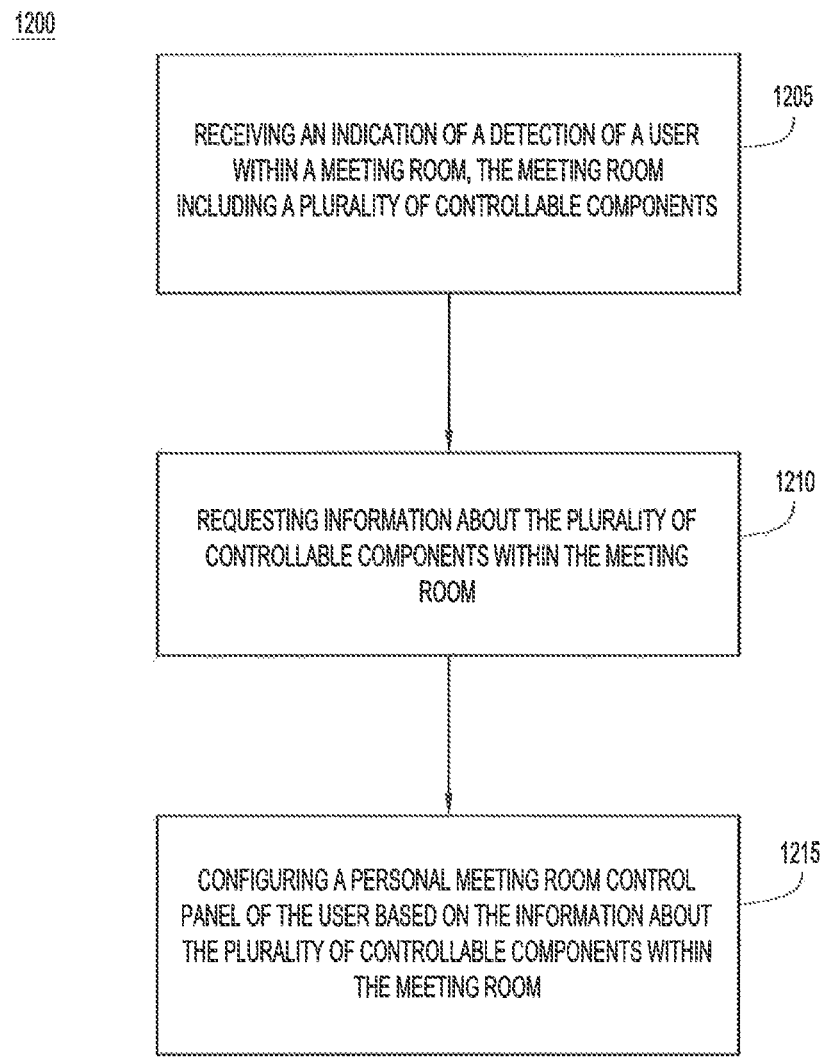
FIG. 12 is a flowchart of a method of dynamically configuring the portal control panel of a participant in proximity to a video conference endpoint, according to an example embodiment.

With reference to FIG. 12, illustrated is a flowchart of a method 1200 performed by the personal control server 120 for configuring the personal control panel 170 of a participant 172 based on the proximity detection of the participant 172 within a meeting room. Reference is also made to FIGS. 1-5, 6A, 6B, 8-10, 11A, 11B, 11C, and 11D for purposes of the description of FIG. 12. At 1205, the personal control server 120 receives an indication of a detection of a user/participant 172 within a meeting room 112(1)-112(N). The meeting room 112(1)-112(N) contains a plurality of controllable components, such as components of a video conference endpoint 116(1)-116(N), respectively, or room components 118(1)-118(N), respectively. At 1210, the personal control server 120 requests information about the plurality of controllable components located within the meeting room 112(1)-112(N). The personal control server 120 may request the information from the building management server 130 which may contain the information for each of the controllable components of a meeting room 112(1)-112(N) or may be able to acquire the information from the building control server 114. At 1215, the personal control server 120 configures a personal control panel 170 of the participant/user 172 based on the information about the controllable components within the meeting room 112(1)-112(N) so that the participant/user 172 can dynamically control the components through their own portable and personal control panel 170.

In summary, participants of scheduled meetings often bring mobile devices with them to the meeting session. These mobile devices may be configured and/or reconfigured to operate as a dynamic personal meeting room control panel that is capable of controlling the controllable components located in whatever meeting room the participant is located and whenever that participant is located in those meeting room. This portable and dynamically reconfigurable personal control panel may eliminate participants having to locate the in-acorn control panel for each room and learn how to operate each component with the in-room control panel. In another embodiment, by having meeting rooms preconfigured for the participants of the meeting, the setup time performed by participants prior to the start of a scheduled meeting may be either reduced or eliminated entirely. Preconfiguring a meeting room, like the personal control panel, may further eliminate participants having to locate the in-room control panel for each room and learn how to operate each component with the in-room control panel.

In one form, a method is provided comprising: receiving an indication of a detection of a user within a meeting room, the meeting room including a plurality of controllable components; requesting information about the plurality of controllable components within the meeting room; and configuring a personal meeting room control panel of the user based on the information about the plurality of controllable components within the meeting room.

In another form, an apparatus is provided comprising: a network interface unit that enables communication over a network; and a processor coupled to the network interface unit, the processor configured to: receive an indication of a detection of a user within a meeting room, the meeting room including a plurality of controllable components, request information about the plurality of controllable components within the meeting room, and configure a personal meeting room control panel of the user based on the information about the plurality of controllable components within the meeting room.

In yet another form, a (non-transitory) processor readable medium is provided. The medium stores instructions that, when executed by a processor, cause the processor to: receive an indication of a detection of a user within a meeting room, the meeting room including a plurality of controllable components, request information about the plurality of controllable components within the meeting room, and configure a personal meeting room control panel of the user based on the information about the plurality of controllable components within the meeting room.

The above description is intended by way of example only. Various modifications and structural changes may be made therein without departing from the scope of the concepts described herein and within the scope and range of equivalents of the claims.

What is claimed is:

1. A method comprising:

by a control server:

receiving from a location server an indication of a detection by the location server of a user within a meeting room among multiple meeting rooms, the meeting room including a plurality of controllable components which include a video conference endpoint to establish audiovisual collaboration sessions with other video conference endpoints, and other controllable components that are not the video conference endpoint;

requesting, from a management server configured to monitor and store information about respective pluralities of controllable components in respective ones of the multiple meeting rooms, information about the plurality of controllable components within the meeting room, wherein the management server is configured to communicate with one or more building control servers that communicate with the meeting room to acquire the information about the plurality of controllable components within the meeting room;

configuring a personal meeting room control panel of the user based on the information about the plurality of controllable components including the video conference endpoint and the other controllable components within the meeting room;

acquiring from a meeting server information for a meeting in the meeting room, wherein the information indicates participants, the meeting room, and a type of meeting that indicates the meeting is a video conference meeting;

responsive to the detection of the user in the meeting room, sending the information to, and acquiring a room setup for the meeting room from, a setting server that stores respective room setups for respective ones of the multiple meeting rooms;

pre-configuring the video conference endpoint and the other controllable components within the meeting room for the video conference meeting according to the room setup; and sending a signal to the control server that indicates states of the video conference endpoint and the other controllable components have changed.

2. The method of claim 1, further comprising:

receiving a control signal from the personal meeting room control panel to change a first component of the plurality of controllable components from a first state to a second state; and sending the control signal to the management server to change the first component within the meeting room from the first state to the second state.

3. The method of claim 1, wherein the meeting room is a first meeting room and the plurality of controllable components of the first meeting room are a first plurality of controllable components, further comprising:

receiving an indication of a detection of the user within a second meeting room that includes a second plurality of controllable components;

requesting information about the second plurality of controllable components within the second meeting room; and reconfiguring the personal meeting room control panel of the user based on the information about the second plurality of controllable components within the second meeting room.

4. The method of claim 1, wherein the plurality of controllable components within the meeting room are further preconfigured based on a type of meeting held in the meeting room.

5. The method of claim 1, wherein the personal meeting room control panel is a function of a software application of an electronic device.

6. The method of claim 1, wherein the personal meeting room control panel is a physical and portable device.

7. The method of claim 1, wherein the meeting room is a video conference meeting room, and the plurality of controllable components include a video conference endpoint configured to establish audiovisual collaboration sessions with other video conference endpoints.

8. The method of claim 1, wherein the other controllable components include controllable lights within the meeting room.

9. An apparatus comprising:

a network interface unit that enables communication over a network; and a processor of a control server coupled to the network interface unit, the processor configured to:

receive from a location server an indication of a detection by the location server of a user within a meeting room among multiple meeting rooms, the meeting room including a plurality of controllable components which include a video conference endpoint to establish audiovisual collaboration sessions with other video conference endpoints, and other controllable components that are not the video conference endpoint, request from a management server, configured to monitor and store information about respective pluralities of controllable components in respective ones of the multiple meeting rooms, information about the plurality of controllable components within the meeting room, wherein the management server is configured to communicate with one or more building control servers that communicate with the meeting room to acquire the information about the plurality of controllable components within the meeting room, configure a personal meeting room control panel of the user based on the information about the plurality of controllable components including the video conference endpoint and the other controllable components within the meeting room, acquire from a meeting server information for a meeting in the meeting room, wherein the information indicates participants, the meeting room, and a type of meeting that indicates the meeting is a video conference meeting, responsive to the detection of the user in the meeting room, send the information to, and acquire a room setup for the meeting room from, a setting server that stores respective room setups for respective ones of the multiple meeting rooms, pre-configure the video conference endpoint and the other controllable components within the meeting room for the video conference meeting according to the room setup, and send a signal to the control server that indicates states of the video conference endpoint and the other controllable components have changed.

10. The apparatus of claim 9, wherein the processor is further configured to:

receive a control signal from the personal meeting room control panel to change a first component of the plurality of controllable components from a first state to a second state; and send the control signal to the management server to change the first component within the meeting room from the first state to the second state.

11. The apparatus of claim 9, wherein the meeting room is a first meeting room and the plurality of controllable components of the first meeting room are a first plurality of controllable components, and the processor is further configured to:

receive an indication of a detection of the user within a second meeting room that includes a second plurality of controllable components;

request information about the second plurality of controllable components within the second meeting room; and reconfigure the personal meeting room control panel of the user based on the information about the second plurality of controllable components within the second meeting room.

12. The apparatus of claim 9, wherein the plurality of controllable components within the meeting room are further preconfigured based on a type of meeting held in the meeting room.

13. The apparatus of claim 9, wherein the personal meeting room control panel is a function of a software application of an electronic device or is a physical and portable device.

14. The apparatus of claim 9, wherein the other controllable components include controllable lights within the meeting room.

15. A non-transitory processor readable medium storing instructions that, when executed by a processor, cause the processor to:

by a control server:

receive from a location server an indication of a detection by the location server of a user within a meeting room among multiple meeting rooms, the meeting room including a plurality of controllable components which include a video conference endpoint to establish audio-visual collaboration sessions with other video conference endpoints, and other controllable components that are not the video conference endpoint;

request, from a management server configured to monitor and store information about respective pluralities of controllable components in respective ones of the multiple meeting rooms, information about the plurality of controllable components within the meeting room, wherein the management server is configured to communicate with one or more building control servers that communicate with the meeting room to acquire the information about the plurality of controllable components within the meeting room;

configure a personal meeting room control panel of the user based on the information about the plurality of controllable components, including the video conference endpoint and the other controllable components, within the meeting room;

acquire from a meeting server information for a meeting in the meeting room, wherein the information indicates participants, the meeting room, and a type of meeting that indicates the meeting is a video conference meeting;

responsive to the detection of the user in the meeting room, send the information to, and acquire a room setup for the meeting room from, a setting server that stores respective room setup preferences for respective ones of the multiple meeting rooms;

pre-configure the video conference endpoint and the other controllable components within the meeting room for the video conference meeting according to the room setup; and send a signal to the control server that indicates states of the video conference endpoint and the other controllable components have changed.

16. The non-transitory processor readable medium of claim 15, further comprising instructions that, when executed by a processor, cause the processor to:

receive a control signal from the personal meeting room control panel to change a first component of the plurality of controllable components from a first state to a second state; and send the control signal to the management server to change the first component within the meeting room from the first state to the second state.

17. The non-transitory processor readable medium of claim 15, wherein the meeting room is a first meeting room and the plurality of controllable components of the first meeting room are a first plurality of controllable components, and further comprising instructions that, when executed by a processor, cause the processor to:

receive an indication of a detection of the user within a second meeting room that includes a second plurality of controllable components;

request information about the second plurality of controllable components within the second meeting room; and reconfigure the personal meeting room control panel of the user based on the information about the second plurality of controllable components within the second meeting room.

18. The non-transitory processor readable medium of claim 15, further comprising instructions that, when executed by a processor, cause the processor to:

preconfigure the plurality of controllable components within the meeting room based on the user detected in the meeting room.

19. The non-transitory processor readable medium of claim 15, wherein the personal meeting room control panel is a function of a software application of an electronic device or is a physical and portable device.

20. The non-transitory processor readable medium of claim 15, wherein the other controllable components include controllable lights within the meeting room.

* * * * *